US005664216A

United States Patent [19]

Blumenau

[11] Patent Number: 5,664,216
[45] Date of Patent: Sep. 2, 1997

[54] ICONIC AUDIOVISUAL DATA EDITING ENVIRONMENT

[76] Inventor: Trevor Blumenau, 2537 Regent St., Suite 204, Berkeley, Calif. 94704

[21] Appl. No.: 653,830

[22] Filed: May 28, 1996

Related U.S. Application Data

[63] Continuation of Ser. No. 215,897, Mar. 22, 1994, abandoned.

[51] Int. Cl.⁶ .................................................. G06F 9/44
[52] U.S. Cl. ........................... 345/302; 345/328; 345/967
[58] Field of Search .................................. 395/328, 327, 395/348, 967, 972, 978, 806, 807

[56] References Cited

U.S. PATENT DOCUMENTS

| | | | |
|---|---|---|---|
| 4,601,055 | 7/1986 | Kent | 382/303 |
| 4,899,136 | 2/1990 | Beard et al. | 395/346 X |
| 4,901,221 | 2/1990 | Kodosky et al. | 395/348 |
| 5,051,898 | 9/1991 | Wright et al. | 395/604 |
| 5,144,548 | 9/1992 | Salandro | 364/138 |
| 5,191,645 | 3/1993 | Carlucci et al. | 395/328 |
| 5,214,756 | 5/1993 | Franklin et al. | 395/328 |
| 5,237,648 | 8/1993 | Mills et al. | 395/328 X |
| 5,388,264 | 2/1995 | Tobias, II et al. | 395/614 |
| 5,390,138 | 2/1995 | Milne et al. | 395/326 X |
| 5,404,316 | 4/1995 | Klinger et al. | 395/792 X |
| 5,420,801 | 5/1995 | Dockter et al. | 364/514 R |
| 5,530,859 | 6/1996 | Tobias, II et al. | 395/650 |
| 5,596,696 | 1/1997 | Tindell et al. | 395/806 |

OTHER PUBLICATIONS

Brown, Michael, "Desktop Video Editing Systems", *Newmedia*, Jun. 1993, pp. 37–43, 46–48.

*Primary Examiner*—Mark R. Powell
*Assistant Examiner*—Crescelle N. dela Torre
*Attorney, Agent, or Firm*—Hitt Chwang & Gaines, P.C.

[57] ABSTRACT

An iconic data editing environment and a method of editing data in such an environment. The environment includes: (1) a working area capable of receiving icons and symbols thereon, (2) a first icon capable of being placed on the working surface and symbolizing a data transformation process, the first icon having a first input portion representing a first process input and an output portion representing a process output and (3) a first data flow symbol capable of being placed on the working surface, symbolizing a communication of data between icons, the first icon and the first symbol freely movable on the working area to symbolize a flow of the first datum as a function of a relative location of the first icon and the first symbol on the working area. A user may therefore establish a process for transforming data by manipulating symbols. In one embodiment, the first datum is a portion of a single frame of a video stream.

56 Claims, 4 Drawing Sheets

ICONIC AUDIOVISUAL DATA EDITING ENVIRONMENT

This application is a continuation of application Ser. No. 08/215,897, filed on Mar. 22, 1994, now abandoned.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed, in general, to data editing and, more specifically, to an iconic environment allowing a user to define the manner in which audio or video ("audiovisual") data is edited by manipulating the relative location of icons and other symbols.

BACKGROUND OF THE INVENTION

Video editing technology is changing dramatically. With the introduction of new and faster Computers, rudimentary A-B roll editing systems are rapidly being surpassed by more powerful and more flexible computer-based digital desktop editing systems.

Some principal companies involved in this emerging technology are Adobe Systems, Apple Computer, Video Toaster and Silicon Graphics. In particular, Silicon Graphics sell pre-configured hardware/software systems to end users for animation and video editing, while Apple Computer sells non-configured hardware (with system software, i.e. QuickTime™) designed for general use, as in their new AV™ series of computers. The Video Toaster™ is an Amiga®-based editing hardware and software platform. Adobe Systems sells Adobe Premier™, a software program that runs on the Apple Macintosh® (and just recently the IBM® PC), that gives users the ability to do non-linear post-production editing of video.

Although Adobe Premier™ has competing products like Avid's VideoShop®, Adobe clearly dominates the marketplace with Premier™. Premier™, however, has several fundamental limitations that arise from the user interface and the consequences of the choice of that user interface. Premier™ uses a time-based (or timeline-based) storyboard analogy for its user interface, which makes any time-sensitive splices or edits difficult to define and implement. Some broadly-stated weaknesses of the user interface include the following:

1. the user is forced to perform unnecessary and time-consuming computations repeatedly to adjust timing;

2. sequential edits, or edits of other edits (compound edits), are extremely cumbersome to perform;

3. prior edits cannot be adjusted without catastrophic effects on later or dependent edits; and 4. the user interface is not intuitive because it does not match the paradigm of the task of editing.

The first and second problems have been addressed by VideoFusion's VideoFusion™, and by Avid's Diva VideoShop®, which allow direct manipulation of effect modules, but the user interfaces of these products force them to eliminate true sequential time-based editing.

The third problem has been addressed with a patch solution by Digital F/X of Mountain View, Calif. Their product, Hitchcock™, allows a user to add locking edit points and stationary markers to the edit worksheet. These controls, however, complicate the storyboard user interface analogy.

The fourth problem is a subjective insight based on detailed studies and research of other user interface design. Such studies have shown that users view editing of audiovisual data in terms of the transformations that the data make through an editing process. The storyboard, timeline paradigm of audiovisual data, while useful for storytelling purposes, does not lend itself to an intuitive understanding of the editing paradigm.

Thus, what is needed in the art is a graphical environment allowing .editing of audiovisual data that draws on a user's intuitive understanding of the editing process, thereby providing a powerful and flexible means by which to edit such data.

SUMMARY OF THE INVENTION

To address and overcome the above-discussed deficiencies of the prior art, it is a primary object of the present invention to provide an iconic, graphical environment allowing a user to design an overall process for transforming audiovisual data by manipulating symbols or icons representing individual transformation processes. It is further an object of the present invention to provide an environment in which one can establish the relative order of transformation processes graphically, designate audiovisual data on which each transformation is to take place graphically and set relative temporal or spatial relationships between the individual processes in a straightforward and intuitive manner.

Accordingly, in the attainment of the above-described primary object, the present invention provides both an iconic audiovisual data editing environment and a method of editing audiovisual data in such an environment. The environment comprises: (1) a working area capable of receiving icons and symbols thereon, (2) a first icon capable of being placed on the working area and symbolizing an audiovisual data transformation process, the first icon having a first input portion representing a first process input and an output portion representing a process output and (3) a first audiovisual data flow symbol capable of being placed on the working area, symbolizing a communication of audiovisual data between icons, the first icon and the first symbol freely movable on the working area to symbolize a flow of the first audiovisual datum as a function of a relative location of the first icon and the first symbol on the working area. The present invention allows a user to establish a process for transforming audiovisual data by manipulating symbols. Although the first audiovisual datum may be audio data, graphical data or photographical data, preferably, the first audiovisual datum is a portion of a single frame of a video stream, allowing the present invention to manipulate streams of data.

The primary advantage of such a structure is that manipulation of audiovisual data (or "editing") can be performed in a much more intuitive fashion, since human beings think in terms of symbols and their relative spatial and temporal relationships. In fact, an important aspect of the present invention is that separate audio or video streams can be temporally or spatially synchronized with one another in a novel fashion, allowing the streams to be manipulated with respect to one another subsequently without losing their synchronicity.

Although the present invention can be embodied in dedicated hardware, the present invention is preferably operable as a series of software instructions on a general purpose computer. In a preferred embodiment, the present invention operates within the environment of a personal computer and within the framework of a graphical user interface ("GUI"), such as found in an Apple Macintosh® or an IBM® PC, Operating under Windows®. Such computers employ a mouse as a pointing device, allowing a user to select and "drag" symbols about on a working area to perform tasks. This graphical user interface is provided in lieu of a more traditional text-based command interface. The look, feel and operation of such GUIs are known to those ordinarily skilled in the art. For the purposes of the present invention, "audiovisual data" is defined as audio data, video data (including graphical or photographical images) or a combination of audio and video data. The video data may be either an individual still frame or a single frame of a video stream.

In a preferred embodiment, more than one type of icon is provided. Some icons, as the one described, contain but a single input. Such an icon, for the purposes of the present invention, are defined as a "filter." In one embodiment of the present invention, the first icon has a second input portion representing a second process input, the second process input capable of receiving a second electrical input signal representing a second audiovisual datum, the process combining and transforming the first and second input signals to produce the electrical output signal at the process output representing a combination and transformation of the first and second audiovisual data. An icon having two inputs is defined as an "effect."

The first icon (that may be a filter, effect or other icon) is initially located along with other icons in an icon selection area proximate the working area. To create an edit, the user selects and drags icons from the icon selection area to the working area, placing the icons in the working area in an order from left to right, symbolizing the order in which the processes represented by the icons are meant to De performed. Icons located vertically above one another are positioned to be performed in parallel.

The audiovisual data flow symbol is preferably graphically represented as a line (with or without an arrow) and is capable of graphically representing a joining of the icons. Thus, to link the icons together into a process, the user clicks and drags the mouse to create lines joining the icons together, thereby denoting a flow of data and an overall editing process.

In one embodiment of the present invention, the user can define a process consisting of a number of icons and audiovisual data flow symbols and can define a single icon as embodying that entire process, akin to the conventional practice of calling subroutines as a single unit. Thus, the first icon may symbolize a plurality of audiovisual data transformation processes. If an icon is defined in terms of other icons and flow symbols, the icon is called "hierarchical."

In a preferred embodiment, the environment of the present invention further comprises source and sink icons. A source icon only has an output and thus represents a source of audiovisual data to be edited. A sink icon only has an input and therefore represents a destination for edited data.

The foregoing has outlined rather broadly the features and technical advantages of the present invention so that the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
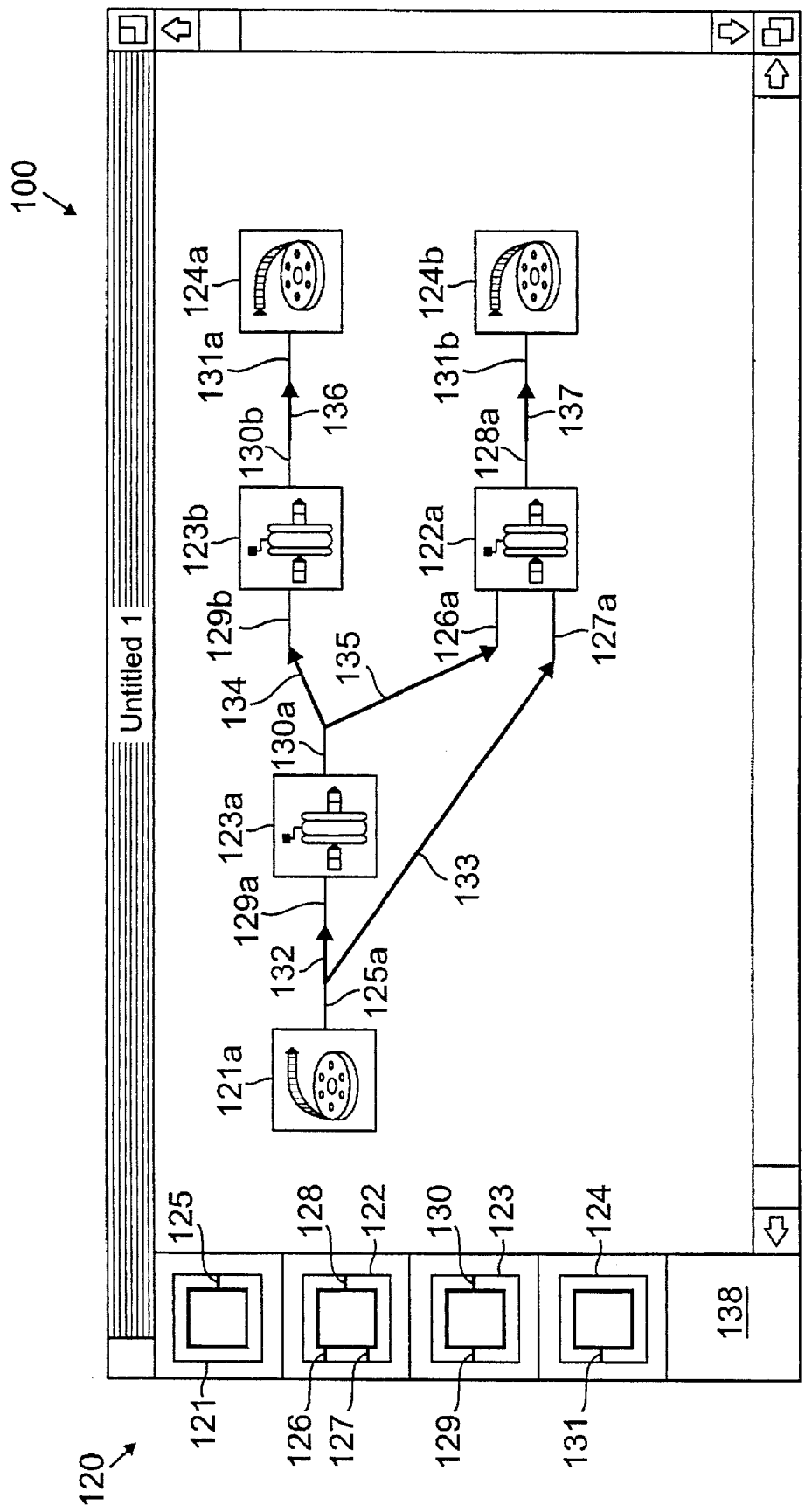
FIG. 1 illustrates the audiovisual data editing environment, including the working area and the icon storage area, of the present invention.

Referring initially to FIG. 1, illustrated is the audiovisual data editing environment of the present invention. The environment, generally designated 100 is preferably formed on a visual display of a general purpose computer (not shown). In its most preferred embodiment, the present invention operates on a personal computer equipped with a GUI-based operating system, such as an Apple Macintosh® or an IBM® PC running under Microsoft® Windows®. The software of the present invention employs the processing and input/output ("I/O") hardware of the computer and makes calls to operating system routines, allowing the software to create a graphical, iconic environment in which to edit audiovisual data. In FIGS. 1 through 5, the software of the present invention is shown as operating on an Apple Macintosh®.

Attached hereto as Appendix "A" is a source code listing (written to work with the commercially-available 'Think Class Library" C++ programming framework by Symantec®) of a software program embodying the present invention and incorporated herein by reference. One ordinarily skilled in the art can make and practice the present invention with reference to Appendix "A."

The environment 100 contains, among other things, a working area 110 and an icon storage area (or "toolbar") 120. The icon storage area 120 contains a plurality of icons that can be selected to form building blocks of an editing process to be schematically designed on the working area 110. Shown are a source icon 121, an effect icon 122, a filter icon 123 and a sink icon 124.

The source icon 121 symbolizes an audiovisual data source, whether the source be real time audio or video from a microphone, camera or computer network or audio or video stored on tape or other storage media. The source icon 121 has an output portion 125 representing a source output. The output portion 125 is symbolized by a short line protruding from the right side of the source icon 121, as shown in FIG. 1. The source icon 121 further has a configuration window associated therewith for allowing a user to provide information regarding the identity and operation of the source output. The configuration window will be described more particularly in conjunction with FIG. 2.

The effect icon 122 symbolizes a multiple source audiovisual data transformation process. In such a process, two inputs are combined to produce an output. Accordingly, the effect icon 122 has multiple input portions 126, 127 representing multiple source process inputs and an output portion 128 representing a multiple source process output. The input portions and output portion 126, 127, 128 are symbolized by short lines protruding from the left and right sides of the effect icon 122, as shown in FIG. 1. The effect icon 122 further has a configuration window associated therewith for allowing a user to provide information regarding the identity and operation of the effect, including a temporal or spatial relationship between the input portions 126, 127 thereof. The configuration window will be described more particularly in conjunction with FIG. 4.

The filter icon 123 symbolizes a single source audiovisual data transformation process. In such a process, one input is transformed to produce an output. Accordingly, the filter icon 123 has a single input portion 129 representing a single source process input and an output portion 130 representing a single source process output. The input portion and output portion 129,130 are symbolized by short lines protruding from the left and right sides of the filter icon 123, as shown in FIG. 1. The filter icon 123 further has a configuration window associated therewith for allowing a user to provide information regarding the identity and operation of the filter, including the temporal or spatial relationship of its input portion 129 to input portions of other effects or filters. The configuration window will be described more particularly in conjunction with FIG. 3.

The sink icon 124 symbolizes an audiovisual data sink or destination, whether the sink be real time audio or video to a speaker, monitor or computer network or audio or video stored on tape or other storage media. The sink icon 124 has an input portion 131 representing a sink input. The input portion 131 is symbolized by a short line protruding from the left side of the sink icon 124, as shown in FIG. 1. The sink icon 124 further has a configuration window associated therewith for allowing a user to provide information regarding the identity and operation of the sink input. The configuration window will be described more particularly in conjunction with FIG. 5.

As shown in FIG. 1, a user has selected a single source icon 121a, dragging the icon 121a from its place in the icon selection area 120 to the working area 110 and placing the icon toward the left side of the working area 110. The user has further chosen two filter icons 123a, 123b and has placed them to the right of the source icon 121a roughly in series with one another. The user has also chosen an effects icon 122a and has placed it somewhat below the second of the two filter icons 123b. Finally, the user has placed two sink icons 124a, 124b on the right side of the working area 110, placing them vertically, one over the other. It should be noted, and it is evident in FIG. 1, that the various icons 121a, 122a, 123a, 123b, 124a, 124b do not need to be precisely aligned horizontally or vertically with one another. The relative placement of the icons does indicate data flow, however.

Once the user has placed the icons 121a, 122a, 123a, 123b, 124a, 124b in their appropriate positions, the user is required to connect the various input and output portions of the icons 121a, 122a, 123a, 123b, 124a, 124b to denote a flow of audiovisual data through the process. The present invention introduces the concept of an audiovisual data flow symbol to denote such a flow. In the illustrated embodiment, the audiovisual data flow symbol is simply a line joining a selected output to a selected input. More than one audiovisual data flow symbol can attach to an output (thereby denoting two destinations for a given output), but any given input can accommodate only one audiovisual data flow symbol. In the illustrated embodiment, combinations of data can therefore only occur within effect processes or other processes having more than one input, although the present invention is not so limited.

In FIG. 1, a first audiovisual data flow symbol 132 is shown joining an output portion 125a of the source icon 121a to a first input portion 129a of the filter icon 123a. A second audiovisual data flow symbol 133 joins the output portion 125a to a second input portion 127a of the effect icon 122a. A third audiovisual data flow symbol 134 joins an output portion 130a of the filter icon 123a to an input portion 129b of the filter icon 123b. A fourth audiovisual data flow symbol 135 joins the output portion 130a to a first input portion 126a of the effect icon 122a. A fifth audiovisual data flow symbol 136 joins an output portion 130b of the filter icon 123b to an input portion 131a of the sink icon 124a. Finally, a sixth audiovisual data flow symbol 137 joins an output 128a of the effect icon 122a to an input 131b of the sink icon 124b.

Thus, the user has defined a data flow originating in a single source, the data flow being filtered twice to produce one output signal delivered to one sink, the data flow being filtered and combined with itself to produce another output signal provided to another sink. The paradigm of the present invention is particularly adept at showing this data flow in an intuitive way.

One of the most powerful aspects of the present invention is its ability to assign a single icon to a process user-defined as an interconnected group of other icons. The single icon is a hierarchical icon, symbolizing multiple audiovisual data transformation processes as a single audiovisual data transformation process. Each hierarchical icon is allowed to have any number of input portions and output portions. The hierarchical icon can be analogized to subroutines in computer programs, wherein a programmer can call for the execution of a series of instructions as though the series were a single instruction. This provides a great tool for the programmer, as it simplifies the creation and debugging of programs. In a like manner, the user's job is greatly simplified when the user can create customized audiovisual processing "subprocesses," subsequently calling the subprocesses simply by manipulating a single hierarchical icon.

In the example provided in FIG. 1, the user could define a hierarchical icon as the combination of the effects icon 122a and the two filter icons 123a, 123b, as joined together by the third and fourth audiovisual data flow symbols 134, 135. In such a case, the hierarchical icon representing this combination would have two input portions (leading to the second input portion 127a and the input portion 129a) and two output portions (leading from the output portion 128a and the output portion 130b). An empty space 138 on the icon storage area 120 is reserved for a hierarchical icon. Obviously, the icon storage area 120 can be expanded to contain as many user-defined hierarchical icons as needed. As with the other icons, the hierarchical icon has a configuration window associated therewith. The hierarchical icon configuration window is constructed in a manner similar to the configuration window for the effect icon, described in conjunction with FIG. 4.

Figure 2:
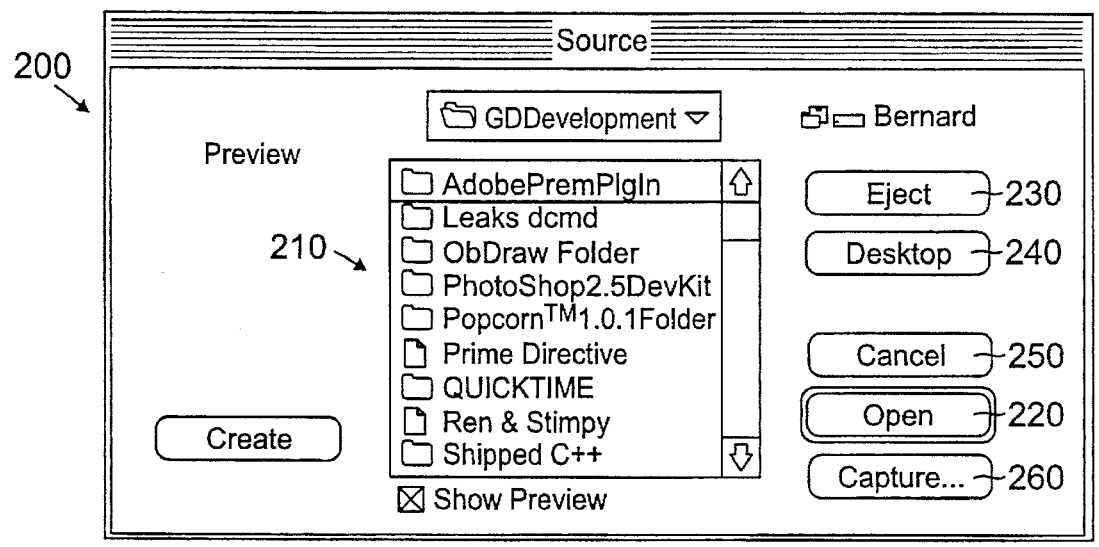
FIG. 2 illustrates a configuration window for the source icon of FIG. 1.

Turning now to FIG. 2, illustrated is a configuration window for the source icon of FIG. 1. The user invokes the configuration window, generally designated 200, by double-clicking on the source icon 121a of FIG. 1. The configuration window 200 allows the user to configure the source icon 121a, thus allowing the user to designate a source of audiovisual data for the editing process. In the illustrated embodiment, the configuration window 200 conforms to a Macintosh®-standard "dialog." The configuration window 200 includes a files area 210 listing potential sources of audiovisual data. The user can designate a particular file in the files area by double-clicking on the selected file or by single-clicking on the selected file and single-clicking an "open" button 220 to select the file. An "eject" button 230 allows a user to eject non-fixed media, typically a floppy disk, to allow substitution of other media. A "desktop" button 240 gives the user access to the conventional desktop interface. A "cancel" button 250 closes the configuration window. Finally, a "capture" button 260 allows capture of audiovisual data from an external source, such as a microphone, camera, audiotape or videotape recorder. Once the user has designated a source, whether it be a file or an external source, the configuration window 200 closes, allowing the user to move to other configuration windows as desired.

There are many types of source processes, some of which are: black, white, capture, noise, silence, rectangle source, triangle source, brick source, pyramid source, conic source, conic section source, Bezier curve source, spline source, text source, and tone generator.

Figure 3:
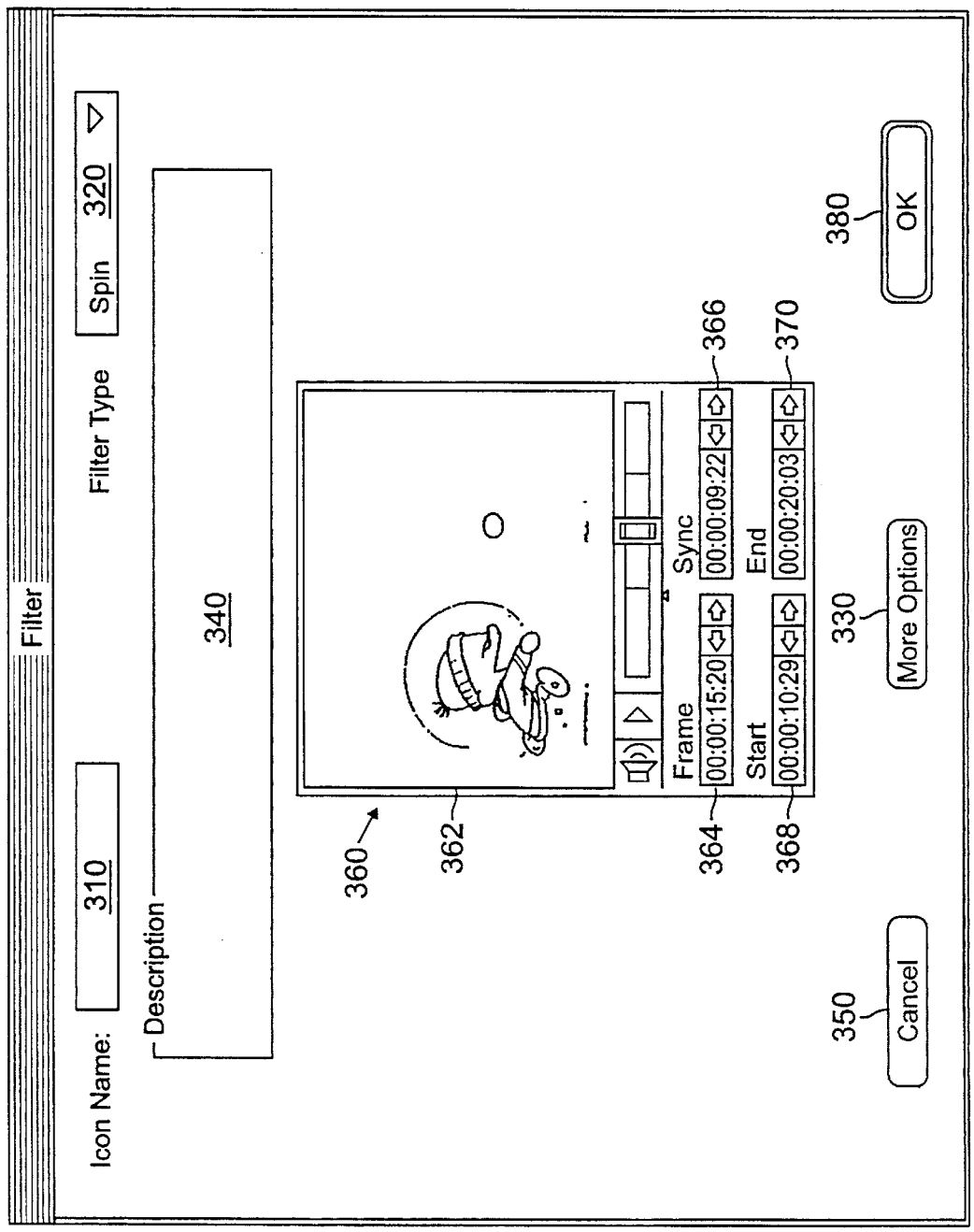
FIG. 3 illustrates a configuration window for the filter icon of FIG. 1.

Turning now to FIG. 3, illustrated is a configuration window for the filter icon of FIG. 1. The user invokes the configuration window, generally designated 300, by double-clicking on one of the filter icons 123a, 123b of FIG. 1. Each icon 123a, 123b has its own configuration window 300. The configuration window 300 allows the user to configure the type and operation of each filter. Again, in the illustrated embodiment, the configuration window 300 conforms to the Macintosh®-standard "dialog."

The configuration window 300 includes an "Icon Name" field 310, allowing a user to give a unique name to each filter icon. If the user names an icon, the name is displayed under the corresponding icon in the screen of FIG. 1. A "Filter Type" field 320 allows the user to choose the type of filter transformation to be performed on the audiovisual data. In the illustrated example the filter type is chosen to be a "spin," wherein input video frames rotate about a center-point of the screen. A rotational rate can be selected by single-clicking a "more options" button 330.

A "description" area 340 provides a space for containing a description of the function of the filter or can, in one embodiment, allow the user to enter a verbal description of the filter or its role in the overall editing process. A "cancel" button 350 closes the configuration window. Centrally located in the configuration window 300 is a central portion 360 including a representation 362 of the visual data as it undergoes the filter transformation. The central portion 360 further includes "frame," "sync," "start" and "end" counters 364, 366, 368, 370. The "frame" counter 364 indicates the frame being represented in the representation 362.

The "sync" counter 366 may be used to establish spatial or temporal relationship between the filter process and the input, for instance allowing the user to designate a specific frame of the input at which a midpoint of the spin or other filter operation is to occur.

The "start" counter 368 allows the user to designate a starting frame number at which the filter is to begin to operate. Finally, the "end" counter 370 allows the user to designate an ending frame number at which the filter is to end its operation. The difference between the ending frame number and the starting frame number divided by the frame rate yields the length of the filter operation, in this case, the length of the spin. Thus, the user may designate operation of a filter by setting any two of a starting, mid or ending point or one of such points and a rate.

There are many types of filter processes, some of which are: add depth, anti-alias, backwards (audio and/or video), bend, blur, boost, brightness/contrast, camera blur, clip, cut, center, compress, decompress, make bold, make underlined, change point size, justify, cut text, set text color, set text font, color balance, color offset, color pass, color replace, convolution kernel, crop, crystallize, echo, emboss, extract, field interpolate, find edges, gamma correction, Gaussian blur, Gaussian sharpen, ghosting, horizontal flip, hue and'saturation, image pan, invert, levels, mesh warp, mosaic, pinch, pointillize, posterize, posterize time, radial blur, replicate, resize, ripple, roll, rotate 2D, rotate 3D, offset 2D, offset 3D, resize, sharpen, sharpen edges, shift, speed up, slow down, spherize, tiles, tint, twirl, vertical flip, video noise, wave, zigzag, graphic pen, dry brush, poster edges, dark strokes, charcoal, fresco, film grain, spatter, chalk and charcoal, emboss, ripple, smudge stick, chrome, mosaic, craquelure, watercolor, accented edges, diffuse glow, palette knife, sprayed strokes, angled strokes, glowing edges, patchwork, stamp, bas relief, grain, photocopy, texturizer, colored pencil, note paper, rough pastels and underpainting. Some of the above can also be used for single frames, photographs or other static graphical images. Audio related filter processes include: amplify, backwards, bender, echo, emphasize, envelope, filter, flanger, noise gate, reverb, shift pitch, smooth, tempo, and FM synthesis. The present invention is not limited to the filters listed here.

Once the user has designated the type and operation of the filter, the user presses an "OK" button 380 and the configuration window 300 closes, allowing the user to move to other configuration windows as desired via the screen of FIG. 1.

Figure 4:
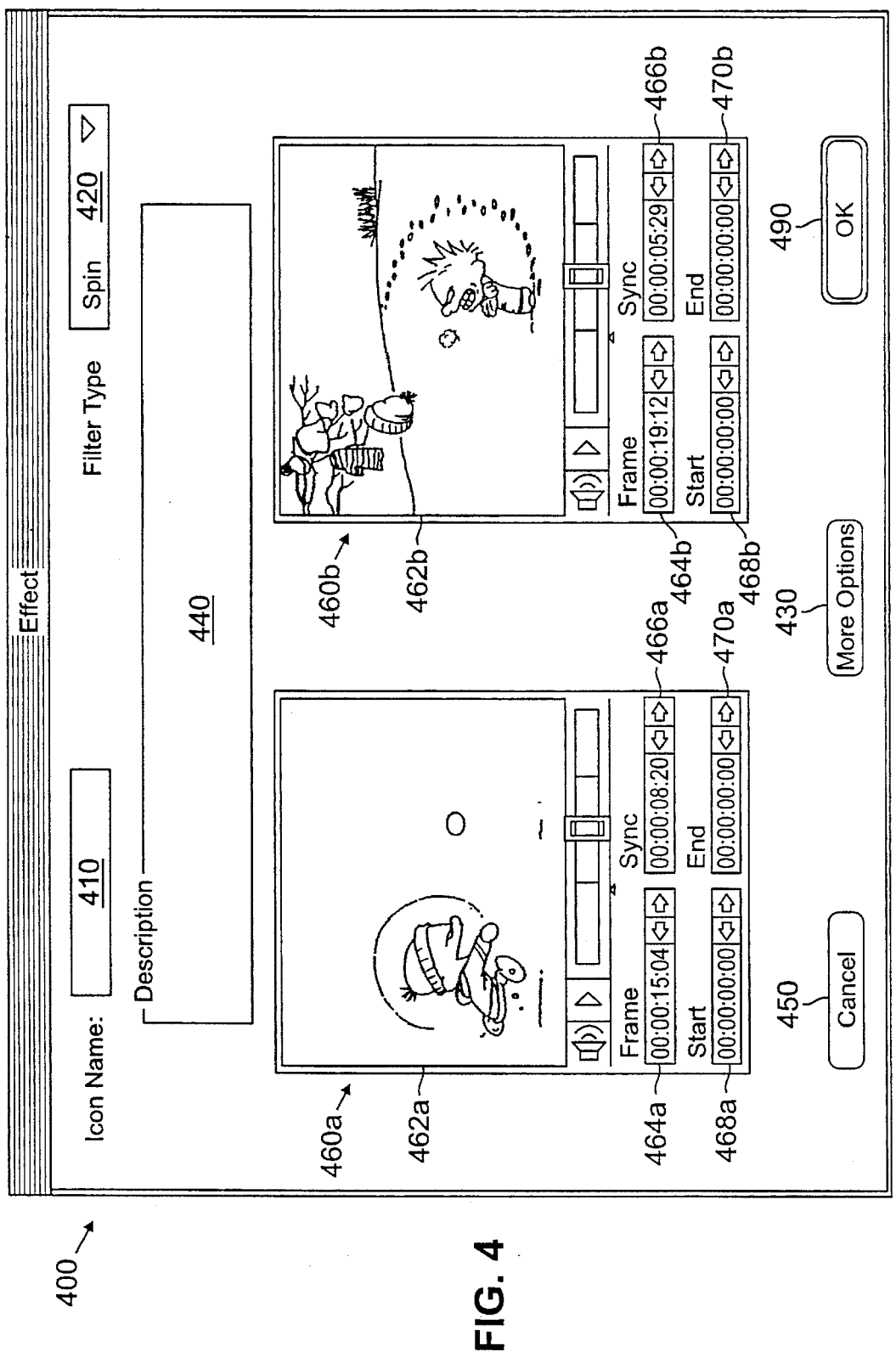
FIG. 4 illustrates a configuration window for the effect icon of FIG. 1.

Turning now to FIG. 4, illustrated is a configuration window for the effect icon of FIG. 1. The user invokes the configuration window, generally designated 400, by double-clicking on the effect icon 122a of FIG. 1. The configuration window 400 allows the user to configure the type and operation of the effect. Again, in the illustrated embodiment, the configuration window 400 conforms to the Macintosh®-standard "dialog."

The configuration window 400 includes an "Icon Name" field 410, allowing a user to give a unique name to each effect icon. If the user names an icon, the name is displayed under the corresponding icon in the screen of FIG. 1. An "Effect Type" field 420 allows the user to choose the type of effect transformation to be performed on the audiovisual data. In the illustrated example, the effect type is chosen to be a "fade," wherein a first stream of video frames dissolves into a second stream of video frames. A fade rate or type can be selected by single-clicking a "more options" button 430.

A "description" area 440 provides a space for containing a description of the function of the effect or can, in one embodiment, allow the user space to enter a verbal description of the effect or its role in the overall editing process. A "cancel" button 450 closes the configuration window. The heart of the configuration window 400 is a pair of central portions 460a, 460b. A first central portion 460a includes a representation 462a of the first stream as it undergoes the effect transformation. A second central portion 460b includes a representation 462b of the second stream as it undergoes the effect transformation. The first central portion 460a further includes first "frame," "sync," "start" and "end" counters 464a, 466a, 468a, 470a. The second central portion 460b also includes second "frame," "sync," "start" and "end" counters 464b, 466b, 468b, 470b. As with the filter configuration window of FIG. 3, the first and second "frame" counters 464a, 464b indicate the frame being represented in the representations 462a, 462b.

The first and second "sync" counters 466a, 466b allow the user to synchronize the two inputs of the effect with each other, allowing the user to establish a relative spatial or temporal relationship between the two inputs. This is a key feature of the present invention, as it allows the inputs of the process to be synchronized relative to one another independent of the operation of the process, giving great flexibility and power to the "process" editing paradigm of the present invention.

The first and second "start" counters 468a, 468b allow the user to designate a starting frame number at which the effect is to begin to operate. Finally, the first and second "end" counters 470a, 470b allow the user to designate the ending frame number.

Operation of the counters will now be explained with reference to FIG. 4. FIG. 4 shows the first representation 462a as a cartoon character throwing an undisclosed projectile. The second representation 462b shows the character staring at a tree from which his clothes are hanging, presumably as a result of retribution dealt out by the recipient of the undisclosed projectile. These two representations 462a, 462b may be of two streams of video data shot simultaneously, but from two different camera angles. As such, the frames of each stream can be synchronized by setting the "sync" counters 466a, 466b with the frame numbers of single frames of their corresponding first and second representations 462a, 462b. These two frames are therefore locked together and ensures that a transition from one stream to the other will not appear awkward or broken. The user then employs the "start" and "end" counters 468a, 468b, 470a, 470b to align the effect with the two streams.

Once the two streams are synchronized, the user can cause the effect to move forward or backward in time or space without disturbing the synchronization of the two streams. Likewise, the user can readjust the synchronization of the two streams, perhaps in an effort to correct a perceived awkward or broken relationship without disturbing the timing of the effect. This is an important feature of a preferred embodiment of the present invention.

Those skilled in the art will realize that the above-described synchronization operates equally well with audio data streams, allowing the user to synchronize audio data with video data or other audio data.

As previously described, the present invention also contemplates use of the "sync" counters 466a, 466b to provide spatial separation of the two input video streams. For instance, one video stream may contain a first object moving from left to right on a horizontal centerline of the screen. The other video stream may contain a second object moving from right to left, again along a horizontal centerline of the screen. The "sync" counters 466a, 466b may be used to bias the first object toward the top of the screen and to bias the second object toward the bottom of the screen. This allows the two objects to pass one another on the screen without coming into contact. This spatial synchronization or offset is further independent of the temporal relationship of the two video streams. For instance, the first object can move across the screen first followed by the second, or vice versa. Once the spatial synchronization is set, the user is free to manipulate the effect or the temporal relationship entirely independently.

There are many types of effect processes, some of which are: additive dissolve, band slide, bandwipe, barn doors, center merge, center peel, center split, channel map, checkerboard, clock wipe, cross dissolve, cross stretch, cross zoom, cube spin, curtain, dither, dissolve, direct, displace, doors, fold up, funnel, inset, iris cross, iris start, iris diamond, iris points, iris round, iris square, luminance map, non-additive dissolve, multi-spin, page peel, page turn, paint splatter, peel back, PICT mask, pinwheel, push, radial wipe, random blocks, random wipe, roll away, slash slide, slide, sliding bands, sliding boxes, spherize, spin, spin away, spiral boxes, split, stretch, swap, swing in, swing out, take, texturize, 3-D, venetian blinds, wedge wipe, wipe, zigzag blocks, zoom, checkerwipe, clock wipe, corner merge, corner swing in, corner swing out, corners overlap, cross emboss and cross mosaic. More advanced effect processes include: dub, add with offset—2D image—2 input, add with offset—2D image—3 input, add with offset—2D image—5 input, add with offset—3D image—2 input, add with offset—3D image—3 input, add with offset—3D image—5 input, morph, shade, append, overlay text/titles, scroll, append text, insert text, and chroma key. The present invention is not limited to the effects listed here.

Once the user has designated the type and operation of the effect, the user presses an "OK" button 490 and the configuration window 400 closes, allowing the user to move to other configuration windows as desired via the screen of FIG. 1.

Figure 5:
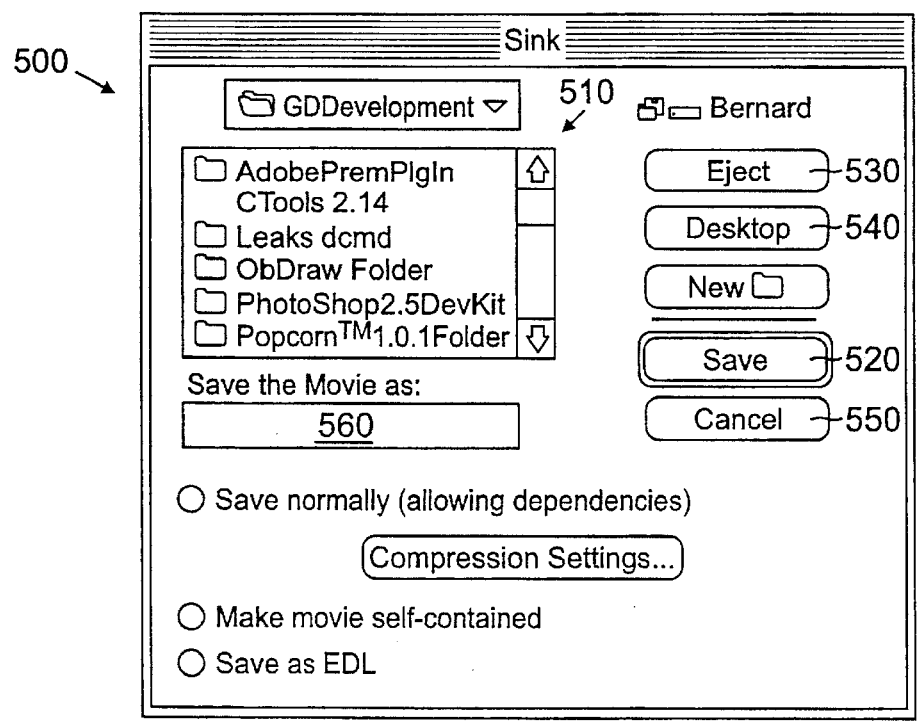
FIG. 5 illustrates a configuration window for the sink icon of FIG. 1.

Turning now to FIG. 5, illustrated is a configuration window for the sink icon of FIG. 1. The user invokes the configuration window, generally designated 500, by double-clicking on either of the sink icons 124a, 124b of FIG. 1. The configuration window 500 allows the user to configure, for example, the sink icon 124a, thus allowing the user to designate a destination for audiovisual data produced by the editing process. In the illustrated embodiment, the configuration window 500 conforms to the Macintosh®-standard "dialog." The configuration window 500 includes a files area 510 listing potential destinations of audiovisual data. The user can designate save the data as a new file by entering a filename in a "Save the Movie as" field 560 or can designate an existing file by double-clicking on the selected file or by single-clicking on the selected file and single-clicking a "save" button 520 to select the file. The audiovisual data or "movie" can be self-contained or can be saved in an industry standard EDL format, allowing the movie to be made a part of a larger movie.

An "eject" button 530 allows a user to eject non-fixed media, typically a floppy disk, to allow substitution of other media. A "desktop" button 540 gives the user access to the conventional desktop interface. Finally, a "cancel" button 550 closes the configuration window. Once the user has designated a sink, the configuration window 500 closes, allowing the user to move to other configuration windows as desired.

There are many types of sink processes, some of which are: display and print to video.

Those skilled in the art will recognize that various alternative forms of the present invention are possible. First, the software of the present invention can be implemented on a special-purpose computer, rather than a general-purpose computer. Further, the present invention can be embodied in hardware. Relative synchronization between inputs of filter and effect operations can be made graphically by way of placing symbols on the working area, rather than by setting counters in the various configuration screens.

From the above, it is apparent that the present invention provides an iconic audiovisual data editing environment and a method of editing audiovisual data in such an environment. The environment comprises: (1) a working area capable of receiving icons and symbols thereon, (2) a first icon capable of being placed on the working area and symbolizing an audiovisual data transformation process, the first icon having a first input portion representing a first process input and an output portion representing a process output and (3) a first audiovisual data flow symbol capable of being placed on the working area, symbolizing a communication of audiovisual data between icons, the first icon and the first symbol freely movable on the working area to symbolize a flow of the first audiovisual datum as a function of a relative location of the first icon and the first symbol on the working area.

Although the present invention and its advantages have been described in detail, it should be understood that various changes, substitutions and alterations can be made herein without departing from the spirit and scope of the invention as defined by the appended claims.

Appendix "A"

```
/*This file is called: "CAddChunkChore.cp"*/
#include "CAddChunkChore.h"
#include "CChunk.h"

void    CAddChunkChore::Perform(
        long    *maxSleep)
{
}                                                                  /* Null Method*/ void    CAddChunkChore::IAddChunkChore(CChunk *theChunk)
{
        itsChunk = theChunk;
}
```

-1-

Appendix "A"

```
/*This file is called: "CAddChunkChore.h"*/
pragma once include "CChore.h"
include "CChunk.h"                                      /* Interface for its superclass*/ class CAddChunkChore : public CChore {                   /* Class Declaration*/
public:
        virtual void       Perform(long *maxSleep);
        virtual void       IAddChunkChore(CChunk *theChunk);
        CChunk    *itsChunk;
};
```

Appendix "A"

```
/*This file is called: "CChunk.cp"*/
#include "CChunk.h"
#include "CAddChunkChore.h"
#include "CRemoveChunkChore.h"
#include "CApplication.h"
extern CApplication  *gApplication;        /* The application */ void CChunk::
IChunk ()
{
  CAddChunkChore *theAddChunk;
  CDirectorOwner::IDirectorOwner (gApplication);
  theAddChunk = new (CAddChunkChore);
  theAddChunk->IAddChunkChore (this);
  gApplication->AssignUrgentChore (theAddChunk);
} void CChunk::
Dispose ()
{
  CRemoveChunkChore *theRemoveChunk;
  inherited::Dispose ();
  theRemoveChunk = new (CRemoveChunkChore);
  theRemoveChunk->IRemoveChunkChore (this);
  gApplication->AssignUrgentChore (theRemoveChunk);
} void CChunk::
Draw ()
{
  itsDrawable->Draw (NULL);
}
```

Appendix "A"

```
/*This file is called: "CChunk.h"*/
pragma once include "CDirectorOwner.h"
include "CDrawable.h"                                       /* Interface for its superclass*/ class CChunk : public CDirectorOwner {      /* Class Declaration*/
public:
        void            IChunk();
        void            Dispose();
        void            Draw();
        CDrawable       *itsDrawable;
};
```

-4-

Appendix "A"

```
/*This file is called: "CDeleteSelectionTask.cp"*/
#include "CDeleteSelectionTask.h"

void    HideWideSelNodes(CObject *theNode)
{
        if (theNode->Selected) {
                theNode->Hide();
                theNode->HideInputs();
                theNode->HideOutputs();
        }
} void    ShowWideSelNodes(CObject *theNode)
{
        if (theNode->Selected) {
                theNode->Show();
                theNode->ShowInputs();
                theNode->ShowOutputs();
        }
} void    DisposeWideSelNodes(CObject *theNode)
{
        if (theNode->Selected) {
                theNode->DisposeInputs();
                theNode->DisposeOutputs();
                theNode->Show();
        }
} void    CDeleteSelectionTask::IDeleteSelectionTask(
        CMultiPane *thePane)
{
        CTask::ITask(9);
        itsPane = thePane;
        (itsPane->itsSubviews)->DoForEach(HideWideSelNodes);
        (((CDirector *)(itsPane->itsSupervisor))->itsWindow)->Update();
        (itsPane->itsSupervisor)->Notify(this);
        itsPane->itsLastTask = this;
} void    CDeleteSelectionTask::Redo()
{
        undone = !undone;
        (itsPane->itsSubviews)->DoForEach(HideWideSelNodes);
        (((CDirector *)(itsPane->itsSupervisor))->itsWindow)->Update();
} void    CDeleteSelectionTask::Undo()
{
        undone = !undone;
        (itsPane->itsSubviews)->DoForEach(ShowWideSelNodes);
        (((CDirector *)(itsPane->itsSupervisor))->itsWindow)->Update();
} void    CDeleteSelectionTask::Dispose()
{
        if (!IsUndone()) {
                (itsPane->itsSubviews)->DoForEach(DisposeWideSelNodes);
                (((CDirector *)(itsPane->itsSupervisor))->itsWindow)->Update();
        }
}
```

-5-

Appendix "A"

```
/*This file is called: "CDeleteSelectionTask.h"*/
#pragma once
#include "CTask.h"
struct LongPt;                                                    /* Interface for its superclass*/
class CDeleteSelectionTask : public CTask {                       /* Class Declaration*/
        void            IDeleteSelectionTask(short aNameIndex);
        virtual void    BeginTracking(struct LongPt *startPt);
        virtual void    KeepTracking(struct LongPt *currPt, struct LongPt *prevPt, struct LongPt *startPt);
        virtual void    EndTracking(struct LongPt *currPt, struct LongPt *prevPt, struct LongPt *startPt);
};
```

-6-

Appendix "A"

```
/*This file is called: "CDragArrow.cp"*/
#include "CDragArrow.h"
#include "CDrawableArrow.h"
#include "CDrawableNode.h"
#include "CList.h"
#include "LongQD.h"
#include "CMultiPane.h"
#include "CDirector.h"
#include "CWindow.h"
#include "CLink.h"
#include "CNode.h"
void CDragArrow::IDragArrow(CMultiPane *thePane,                              CDrawableArrow *aDrawableArrow)
{
        CMouseTask::IMouseTask( 7);
        itsDrawableArrow = aDrawableArrow;
        itsPane = thePane;
        itsOldHead = itsNewHead = itsDrawableArrow->GetHead();
        itsOldTail = itsNewTail = itsDrawableArrow->GetTail();
        (itsPane->itsSubviews)->SendBack(itsDrawableArrow);
} void CDragArrow::BeginTracking( LongPt *startPt)
{
} void CDragArrow::KeepTracking(LongPt *currPt, LongPt *prevPt, LongPt *startPt)
{
} void    CDragArrow::EndTracking(
        LongPt          *currPt,
        LongPt          *prevPt,
        LongPt          *startPt)
{
} void    CDragArrow::Undo()
{
        CLink   *aLink;
        if (deleted) {
                aLink = new(CLink);
                aLink->ILink(itsPane,itsOldTail,itsOldHead);
                itsDrawableArrow = (CDrawableArrow *)aLink->itsDrawable;
        }
        itsDrawableArrow->SetHead(itsOldHead);
        itsDrawableArrow->SetTail(itsOldTail);
        DoOldAttach();
        (((CDirector *)(itsPane->itsSupervisor))->itsWindow)->Update();
}

Boolean CDragArrow::OK()
{
        return(itsPane->FindHitInput(itsNewHead)&&
                itsPane->FindHitOutput(itsNewTail)&&
                (!(itsPane->FindHitHead(itsNewHead)!=itsDrawableArrow)));
} void    CDragArrow::Redo()
{
        LongPt  cpoint;
        itsDrawableArrow->SetHead(itsNewHead);
        itsDrawableArrow->SetTail(itsNewTail);
        DoNewAttach();
        if (deleted) {
                (itsDrawableArrow->itsChunk)->Dispose();
        }
        (((CDirector *)(itsPane->itsSupervisor))->itsWindow)->Update();
} void    CDragArrow::DoNewAttach()
{
        CDrawableNode   *theDNode;
        Remove(itsOldTail);
        Remove(itsOldHead);
        if (!deleted) {
                Attach(itsNewHead);
                Attach(itsNewTail);
                theDNode = itsPane->FindHitInput(itsNewHead);
                if (theDNode) {
                        ((CLink *)itsDrawableArrow->itsChunk)->
                                UpdateHeadConnection((CNode *)(theDNode->itsChunk));
                }
                else {
                        ((CLink *)itsDrawableArrow->itsChunk)->
                                UpdateHeadConnection(NULL);
                }
                theDNode = itsPane->FindHitInput(itsNewTail);
                if (theDNode) {
                        ((CLink *)itsDrawableArrow->itsChunk)->
                                UpdateTailConnection((CNode *)(theDNode->itsChunk));
                }
                else {
                        ((CLink *)itsDrawableArrow->itsChunk)->
                                UpdateTailConnection(NULL);
                }
        }
}
```

-7-

Appendix "A"

```
void    CDragArrow::DoOldAttach()
{
        CDrawableNode  *theDNode;
        if (!deleted) {
                Remove(itsNewHead);
                Remove(itsNewHead);
        }
        Attach(itsOldHead);
        Attach(itsOldTail);
        theDNode = itsPane->FindHitInput(itsOldHead);
        if (theDNode) {
                ((CLink *)itsDrawableArrow->itsChunk)->
                                UpdateHeadConnection((CNode *)(theDNode->itsChunk));
        }
        else {
                ((CLink *)itsDrawableArrow->itsChunk)->
                                UpdateHeadConnection(NULL);
        }
        theDNode = itsPane->FindHitInput(itsOldTail);
        if (theDNode) {
                ((CLink *)itsDrawableArrow->itsChunk)->
                                UpdateTailConnection((CNode *)(theDNode->itsChunk));
        }
        else {
                ((CLink *)itsDrawableArrow->itsChunk)->
                                UpdateTailConnection(NULL);
        }
} void    CDragArrow::Remove(Point thePoint)
{
        CList   *theList;
        if (theList = ListFindHit(thePoint)) {
                theList->Remove(itsDrawableArrow->itsChunk);
        }
} void    CDragArrow::Attach(Point thePoint)
{
        CList   *theList;
        if (theList = ListFindHit(thePoint)) {
                theList->Append(itsDrawableArrow->itsChunk);
        }
}

CList*  CDragArrow::ListFindHit(Point hitPt)
{
        short   numItems,k;
        CDrawable *theDrawable;
        numItems = (itsPane->itsSubviews)->GetNumItems();
        if (numItems != 0)
        {
                for (theDrawable = (CDrawable *) (itsPane->itsSubviews)->FirstItem(),k=1;
                                k<=numItems;
                                k++,
                                theDrawable = (CDrawable *) (itsPane->itsSubviews)->NthItem(k)) {
                        if (theDrawable->HitInput1(hitPt))
                                return(((CNode *)(theDrawable->itsChunk))->its1Input);
                        if (theDrawable->HitInput2(hitPt))
                                return(((CNode *)(theDrawable->itsChunk))->its2Input);
                        if (theDrawable->HitOutput(hitPt))
                                return(((CNode *)(theDrawable->itsChunk))->itsOutput);
                }
        }
        return(NULL);
}
```

-8-

Appendix "A"

```
/*This file is called: "CDragArrow.h"*/
#pragma once
#include "CMouseTask.h"
#include "LongCoordinates.h"
CLASS CList;
CLASS CDrawableArrow;
CLASS CMultiPane;
class CDragArrow : public CMouseTask
{
        void IDragArrow(CMultiPane *thePane,
                                                                                CDrawableArrow *aDrawableArrow);
        virtual void Undo(void);
        virtual void Redo(void);
        virtual void BeginTracking( LongPt *startPt);
        virtual void KeepTracking( LongPt *currPt, LongPt *prevPt, LongPt *startPt);
        virtual void EndTracking( LongPt *currPt, LongPt *prevPt, LongPt *startPt);
        virtual Boolean OK(void);
        virtual void DoNewAttach();
        virtual void DoOldAttach();
        virtual void Remove(Point thePoint);
        virtual void Attach(Point thePoint);
        virtual CList* ListFindHit(Point thePoint);
protected:
        CDrawableArrow   *itsDrawableArrow;
        CMultiPane       *itsPane;
        CDrawableArrow   *itsTempArrow;
        Point            itsOldHead,itsNewHead,itsOldTail,itsNewTail;
        Boolean          deleted;
};
```

-9-

Appendix "A"

```
/*This file is called: "CDragArrowHead.cp"*/
#include "CDragArrowHead.h"
#include "CDrawableArrow.h"
#include "CMultiPane.h"
#include "CDirector.h"
#include "CChunk.h"
#include "CWindow.h"
void CDragArrowHead::IDragArrowHead(CMultiPane *thePane,
                                                                        CDrawableArrow *aDrawableArrow)
{
        CDragArrow::IDragArrow(thePane,aDrawableArrow);
} void CDragArrowHead::BeginTracking( LongPt *startPt)
{
} void CDragArrowHead::KeepTracking(LongPt *currPt, LongPt *prevPt, LongPt *startPt)
{
        Point   cPoint;
        if (((!EqualLongPt(currPt, prevPt))||(itsPane->AutoScroll(currPt))) {
                LongToQDPt(currPt,&cPoint);
                itsDrawableArrow->SetHead(cPoint);
                (((CDirector *)(itsPane->itsSupervisor))->itsWindow)->Update();
        }
} void    CDragArrowHead::EndTracking(
        LongPt                  *currPt,
        LongPt                  *prevPt,
        LongPt                  *startPt)
{
        Point   cPoint;
        LongToQDPt(currPt,&cPoint);
        itsDrawableArrow->SetHead(cPoint);
        itsNewHead = itsDrawableArrow->GetHead();
        itsNewTail = itsDrawableArrow->GetTail();
        if (OK()) {
                deleted = false;
                DoNewAttach();
        }
        else {
                deleted = true;
                Remove(itsOldHead);
                Remove(itsOldTail);
                (itsDrawableArrow->itsChunk)->Dispose();
        }
        (((CDirector *)(itsPane->itsSupervisor))->itsWindow)->Update();
        (itsPane->itsSupervisor)->Notify(this);
        itsPane->itsLastTask = this;
}
```

-10-

Appendix "A"

```
/*This file is called: "CDragArrowHead.h"*/
#pragma once
#include "CDragArrow.h"
CLASS CDrawableArrow;
CLASS CMultiPane;

class CDragArrowHead : public CDragArrow
{
        void IDragArrowHead(CMultiPane *thePane,                     CDrawableArrow *aDrawableArrow);

virtual void BeginTracking( LongPt *startPt);
        virtual void KeepTracking( LongPt *currPt, LongPt *prevPt, LongPt *startPt);
        virtual void EndTracking( LongPt *currPt, LongPt *prevPt, LongPt *startPt);
};
```

-11-

Appendix "A"

```
/*This file is called: "CDragArrowTail.cp"*/
#include "CDragArrowTail.h"
#include "CDrawableArrow.h"
#include "CLink.h"
#include "LongQD.h"
#include "CMultiPane.h"
#include "CDirector.h"
#include "CWindow.h"

void CDragArrowTail::IDragArrowTail(CMultiPane *thePane,
                                                              CDrawableArrow *aDrawableArrow)
{
        CDragArrow::IDragArrow(thePane,aDrawableArrow);
} void CDragArrowTail::BeginTracking( LongPt *startPt)
{
} void CDragArrowTail::KeepTracking(LongPt *currPt, LongPt *prevPt, LongPt *startPt)
{
        Point   cPoint;
        if ((!EqualLongPt(currPt, prevPt))||(itsPane->AutoScroll(currPt))) {
                LongToQDPt(currPt,&cPoint);
                itsDrawableArrow->SetTail(cPoint);
                (((CDirector *)(itsPane->itsSupervisor))->itsWindow)->Update();
        }
} void    CDragArrowTail::EndTracking(
        LongPt          *currPt,
        LongPt          *prevPt,
        LongPt          *startPt)
{
        Point   cPoint;
        LongToQDPt(currPt,&cPoint);
        itsDrawableArrow->SetTail(cPoint);
        itsNewHead = itsDrawableArrow->GetHead();
        itsNewTail = itsDrawableArrow->GetTail();
        if (OK()) {
                deleted = false;
                DoNewAttach();
        }
        else {
                deleted = true;
                Remove(itsOldHead);
                Remove(itsOldTail);
                (itsDrawableArrow->itsChunk)->Dispose();
        }
        (((CDirector *)(itsPane->itsSupervisor))->itsWindow)->Update();
        (itsPane->itsSupervisor)->Notify(this);
        itsPane->itsLastTask = this;
}
```

-12-

Appendix "A"

```
/*This file is called: "CDragArrowTail.h"*/
#pragma once
#include "CDragArrow.h"
#include "LongCoordinates.h"
CLASS CLink;
CLASS CDrawableArrow;
CLASS CMultiPane;
class CDragArrowTail : public CDragArrow
{
        void IDragArrowTail(CMultiPane *thePane,
                                                                    CDrawableArrow *aDrawableArrow);
        virtual void KeepTracking( LongPt *currPt, LongPt *prevPt, LongPt *startPt);
        virtual void EndTracking( LongPt *currPt, LongPt *prevPt, LongPt *startPt);
        virtual void BeginTracking( LongPt *startPt);
};
```

Appendix "A"

```
/*This file is called: "CDragNewArrowHead.cp"*/
#include "CDragNewArrowHead.h"
#include "CDrawableArrow.h"
#include "CLink.h"
#include "LongQD.h"
#include "CMultiPane.h"
#include "CDirector.h"
#include "CWindow.h"
void CDragNewArrowHead::IDragNewArrowHead(CMultiPane *thePane)
{
        Point   junk;
        CLink   *aLink;
        junk.h = junk.v = 0;
        aLink = new(CLink);
        aLink->ILink(thePane,thePane,junk,junk);
        itsDrawableArrow = (CDrawableArrow *)aLink->itsDrawable;
        CDragArrow::IDragArrow(thePane,itsDrawableArrow);
} void CDragNewArrowHead::BeginTracking( LongPt *startPt)
{
        Point   start;
        LongToQDPt(startPt,&start);
        itsOldHead.h = start.h+kGridSize;
        itsOldHead.v = start.v;
        itsOldTail = start;
        itsDrawableArrow->SetHead(itsOldHead);
        itsDrawableArrow->SetTail(itsOldTail);
} void CDragNewArrowHead::KeepTracking(LongPt *currPt, LongPt *prevPt, LongPt *startPt)
{
        Point   cPoint;
        if ((!EqualLongPt(currPt, prevPt))||(itsPane->AutoScroll(currPt))) {
                LongToQDPt(currPt,&cPoint);
                itsDrawableArrow->SetHead(cPoint);
                (((CDirector *)(itsPane->itsSupervisor))->itsWindow)->Update();
        }
} void CDragNewArrowHead::EndTracking(
        LongPt          *currPt,
        LongPt          *prevPt,
        LongPt          *startPt)

{
        Point   cPoint;
        LongToQDPt(currPt,&cPoint);
        itsDrawableArrow->SetHead(cPoint);
        itsNewHead = itsDrawableArrow->GetHead();
        itsNewTail = itsDrawableArrow->GetTail();
        if (OK()) {
                deleted = false;
                DoNewAttach();
        }
        else {
                deleted = true;
                (itsDrawableArrow->itsChunk)->Dispose();
        }
        (((CDirector *)(itsPane->itsSupervisor))->itsWindow)->Update();
        (itsPane->itsSupervisor)->Notify(this);
        itsPane->itsLastTask = this;
        if (deleted) {
                itsPane->itsLastTask = NULL;
                (itsPane->itsSupervisor)->Notify(NULL);
        }
} void    CDragNewArrowHead::Undo()
{
        Remove(itsNewHead);
        Remove(itsNewTail);
        (itsDrawableArrow->itsChunk)->Dispose();
        (((CDirector *)(itsPane->itsSupervisor))->itsWindow)->Update();
} void    CDragNewArrowHead::Redo()
{
        CLink   *aLink;
        aLink = new(CLink);
        aLink->ILink(itsPane,itsPane,itsNewTail,itsNewHead);
        itsDrawableArrow = (CDrawableArrow *)aLink->itsDrawable;
        itsDrawableArrow->Hide();
        itsDrawableArrow->Show();
        DoNewAttach();
        (((CDirector *)(itsPane->itsSupervisor))->itsWindow)->Update();
}
```

-14-

Appendix "A"

```
/*This file is called: "CDragNewArrowHead.h"*/
#pragma once
#include "CDragArrowHead.h"
#include "LongCoordinates.h"
CLASS CLink;
CLASS CDrawableArrow;
CLASS CMultiPane;

class CDragNewArrowHead : public CDragArrow
{
        void IDragNewArrowHead(CMultiPane *thePane);

virtual void Undo(void);
        virtual void Redo(void);

virtual void BeginTracking( LongPt *startPt);
        virtual void EndTracking( LongPt *currPt, LongPt *prevPt, LongPt *startPt);
        virtual void KeepTracking(LongPt *currPt, LongPt *prevPt, LongPt *startPt);
};
```

Appendix "A"

```
/*This file is called: "CDragNewArrowTail.cp"*/
#include "CDragNewArrowTail.h"
#include "CDrawableArrow.h"
#include "CLink.h"
#include "LongQD.h"
#include "CMultiPane.h"
#include "CDirector.h"
#include "CWindow.h"

void CDragNewArrowTail::IDragNewArrowTail(CMultiPane *thePane)
{
    Point junk;
    CLink  *aLink;
    junk.h = junk.v = 0;
    aLink = new(CLink);
    aLink->ILink(thePane,thePane,junk,junk);
    itsDrawableArrow = (CDrawableArrow *)aLink->itsDrawable;
    CDragArrow::IDragArrow(thePane,itsDrawableArrow);
} void CDragNewArrowTail::BeginTracking( LongPt *startPt)
{
    Point start;
    LongToQDPt(startPt,&start);
    itsOldTail.h = start.h-kGridSize;
    itsOldTail.v = start.v;
    itsOldHead = start;
    itsDrawableArrow->SetHead(itsOldHead);
    itsDrawableArrow->SetTail(itsOldTail);
} void CDragNewArrowTail::KeepTracking(LongPt *currPt, LongPt *prevPt, LongPt *startPt)
{
    Point  cPoint;
    if ((!EqualLongPt(currPt, prevPt))||(itsPane->AutoScroll(currPt))) {
        LongToQDPt(currPt,&cPoint);
        itsDrawableArrow->SetTail(cPoint);
        (((CDirector *)(itsPane->itsSupervisor))->itsWindow)->Update();
    }
} void    CDragNewArrowTail::EndTracking(
        LongPt          *currPt,
        LongPt          *prevPt,
        LongPt          *startPt)
{
    Point   cPoint;
    LongToQDPt(currPt,&cPoint);
    itsDrawableArrow->SetTail(cPoint);
    itsNewHead = itsDrawableArrow->GetHead();
    itsNewTail = itsDrawableArrow->GetTail();
    if (OK()) {
        deleted = false;
        DoNewAttach();
    }
    else {
        deleted = true;
        (itsDrawableArrow->itsChunk)->Dispose();
    }
    (((CDirector *)(itsPane->itsSupervisor))->itsWindow)->Update();
    (itsPane->itsSupervisor)->Notify(this);
    itsPane->itsLastTask = this;

if (deleted) {
        itsPane->itsLastTask = NULL;
        (itsPane->itsSupervisor)->Notify(NULL);
    }
} void    CDragNewArrowTail::Undo()
{
    Remove(itsNewHead);
    Remove(itsNewTail);
    (itsDrawableArrow->itsChunk)->Dispose();
    (((CDirector *)(itsPane->itsSupervisor))->itsWindow)->Update();
} void    CDragNewArrowTail::Redo()
{
    CLink   *aLink;
    aLink = new(CLink);
    aLink->ILink(itsPane,itsPane,itsNewTail,itsNewHead);
    itsDrawableArrow = (CDrawableArrow *)aLink->itsDrawable;
    itsDrawableArrow->Hide();
    itsDrawableArrow->Show();
    DoNewAttach();
    (((CDirector *)(itsPane->itsSupervisor))->itsWindow)->Update();
}
```

-16-

Appendix "A"

```
/*This file is called: "CDragNewArrowTail.h"*/
#pragma once
#include "CDragArrowTail.h"
#include "LongCoordinates.h"
CLASS CLink;
CLASS CDrawableArrow;
CLASS CMultiPane;

class CDragNewArrowTail : public CDragArrow
{
        void IDragNewArrowTail(CMultiPane *thePane);

virtual void Undo(void);
        virtual void Redo(void);

virtual void BeginTracking( LongPt *startPt);
        virtual void EndTracking( LongPt *currPt, LongPt *prevPt, LongPt *startPt);
        virtual void KeepTracking(LongPt *currPt, LongPt *prevPt, LongPt *startPt);
};
```

Appendix "A"

```
/*This file is called: "CDragNode.cp"*/
#include "CDragNode.h"
#include "CDrawableNode.h"
#include "CNode.h"
#include "LongQD.h"
#include "CMultiPane.h"
#include "CDirector.h"
#include "CWindow.h"
#include "CLink.h"
#include "CList.h"

void CDragNode::IDragNode(CMultiPane *thePane)
{
        CMouseTask::IMouseTask( 8);
        itsPane = thePane;
} void CDragNode::BeginTracking( LongPt *startPt)
{
        Rect r;
        (((CDirector *)(itsPane->itsSupervisor))->itsWindow)->Update();
} void DisplaceLinkHead(CObject *theLink,long diff)
{
        Point theHead;
        (((CLink *)(theLink))->itsDrawable)->Hide();
        theHead=((CDrawableArrow *)(((CLink *)(theLink))->itsDrawable))->itsHead;
        theHead.h+=((Point *)diff)->h;
        theHead.v+=((Point *)diff)->v;
        (((CDrawableArrow *)((CLink *)(theLink))->itsDrawable))->SetHead(theHead);
        (((CDrawableArrow *)((CLink *)(theLink))->itsDrawable))->Show();
} void DisplaceLinkTail(CObject *theLink,long diff)
{
        Point theTail;
        (((CLink *)(theLink))->itsDrawable)->Hide();
        theTail=((CDrawableArrow *)(((CLink *)(theLink))->itsDrawable))->itsTail;
        theTail.h+=((Point *)diff)->h;
        theTail.v+=((Point *)diff)->v;
        (((CDrawableArrow *)((CLink *)(theLink))->itsDrawable))->SetTail(theTail);
        (((CDrawableArrow *)((CLink *)(theLink))->itsDrawable))->Show();
} void DisplaceSelNodes(CObject *theDrawableNode,long diff)
{
        if (member(theDrawableNode,CDrawableNode)) {
                if (((CDrawableNode *)(theDrawableNode))->Selected) {
                        Point thePoint;
                        ((CDrawableNode *)(theDrawableNode))->Hide();
                        thePoint =((CDrawableNode *)(theDrawableNode))->GetTopLeft();
                        thePoint.h += ((Point *)diff)->h;
                        thePoint.v += ((Point *)diff)->v;
                        ((CDrawableNode *)(theDrawableNode))->SetTopLeft(thePoint);
                        ((CDrawableNode *)(theDrawableNode))->Show();
                        ((((CNode *)(((CDrawableNode *)(theDrawableNode))->
                                itsChunk))->itsInput)->DoForEach1(DisplaceLinkHead,(long)(diff)));
                        ((((CNode *)(((CDrawableNode *)(theDrawableNode))->
                                itsChunk))->its2Input)->DoForEach1(DisplaceLinkHead,(long)(diff)));
                        ((((CNode *)(((CDrawableNode *)(theDrawableNode))->
                                itsChunk))->itsOutput)->DoForEach1(DisplaceLinkTail,(long)(diff)));
                }
        }
} void CDragNode::KeepTracking(LongPt *currPt, LongPt *prevPt, LongPt *startPt)
{
        LongPt theOri;
        itsPane->AutoScroll(currPt);
        if (!EqualLongPt(currPt, prevPt)) {
                Point diff;
                diff.h = currPt->h-prevPt->h;
                diff.v = currPt->v-prevPt->v;
                (itsPane->itsSubviews)->DoForEach1(DisplaceSelNodes,(long)&diff);
                (((CDirector *)(itsPane->itsSupervisor))->itsWindow)->Update();
        }
} void    CDragNode::EndTracking(
        LongPt          *currPt,
        LongPt          *prevPt,
        LongPt          *startPt)
{
        TheDiff.h = currPt->h-startPt->h;
        TheDiff.v = currPt->v-startPt->v;

(itsPane->itsSupervisor)->Notify(this);
        itsPane->itsLastTask = this;
} void    CDragNode::Undo()
{
        Point diff;
        diff.h = -TheDiff.h;
        diff.v = -TheDiff.v;
        (itsPane->itsSubviews)->DoForEach1(DisplaceSelNodes,((long)(&diff)));
        (((CDirector *)(itsPane->itsSupervisor))->itsWindow)->Update();
}
```

-18-

Appendix "A"

```
void    CDragNode::Redo()
{
        (itsPane->itsSubviews)->DoForEach1(DisplaceSelNodes,(long) &TheDiff);
        (((CDirector *)(itsPane->itsSupervisor))->itsWindow)->Update();
}
```

Appendix "A"

```
/*This file is called: "CDragNode.h"*/
#pragma once
#include "CMouseTask.h"
#include "LongCoordinates.h"
CLASS CNode;
CLASS CDrawableNode;
CLASS CMultiPane;
class CDragNode : public CMouseTask
{
        void IDragNode(CMultiPane *thePane);
        virtual void Undo(void);
        virtual void Redo(void);
        virtual void BeginTracking( LongPt *startPt);
        virtual void KeepTracking( LongPt *currPt, LongPt *prevPt, LongPt *startPt);
        virtual void EndTracking( LongPt *currPt, LongPt *prevPt, LongPt *startPt);
protected:
        CMultiPane       *itsPane;
        Point            TheDiff;
};
```

Appendix "A"

```
/*This file is called: "CDrawable.cp"*/
#include "CDrawable.h"
#include "CCollaborator.h"
void        CDrawable::IDrawable(CView       *anEnclosure,
                                 CBureaucrat *aSupervisor,
                                 short       aWidth,
                                 short       aHeight,
                                 short       aHEncl,
                                 short       aVEncl,
                                 CChunk      *theOwner)
{
        CPane::IPane(anEnclosure,aSupervisor,
                                 aWidth,aHeight,aHEncl,aVEncl,
                                 sizPIXEDSTICKY,sizPIXEDSTICKY);
        itsChunk = theOwner;
} void        CDrawable::Draw(Rect *area)
{
}

Boolean     CDrawable::HitHead(Point hitPt)
{
        return(FALSE);
}
Boolean     CDrawable::HitTail(Point hitPt)
{
        return(FALSE);
}
Boolean     CDrawable::HitInput1(Point hitPt)
{
        return(FALSE);
}
Boolean     CDrawable::HitInput2(Point hitPt)
{
        return(FALSE);
}
Boolean     CDrawable::HitInput(Point hitPt)
{
        return(FALSE);
}
Boolean     CDrawable::HitOutput(Point hitPt)
{
        return(FALSE);
}
Boolean     CDrawable::Hit(Point hitPt)
{
        return(FALSE);
} void        CDrawable::Dispose()
{
        if (visible)
                Hide();
        inherited::Dispose();
} void        CDrawable::DrawFrame()
{
}
```

-21-

Appendix "A"

```
/*This file is called: "CDrawable.h"*/
#pragma once
#include "CPane.h"
#include "extras.h"                              /* Interface for its superclass          */
CLASS    CChunk;
#define kGridSize 12
class CDrawable : public CPane {         /* Class Declaration
        void              IDrawable(             CView                                 */
                                                        *anEnclosure,       */
                                        CBureaucrat       *aSupervisor,
                                        short                       aWidth,
                                        short                       aHeight,
                                        short                       aHEncl,
                                        short                       aVEncl,
                                        CChunk            *theOwner);

void              Dispose();
        virtual void      Draw(Rect *area);
        virtual void      DrawFrame();
        virtual Boolean   HitHead(Point hitPt);
        virtual Boolean   HitTail(Point hitPt);
        virtual Boolean   HitInput1(Point hitPt);
        virtual Boolean   HitInput2(Point hitPt);
        virtual Boolean   HitInput(Point hitPt);
        virtual Boolean   HitOutput(Point hitPt);
        virtual Boolean   Hit(Point hitPt);
        CChunk   *itsChunk;
};
```

-22-

Appendix "A"

```
/*This file is called: "CDrawableArrow.cp"*/
#include "CDrawableArrow.h"
#include "LongQD.h"

void        CDrawableArrow::IDrawableArrow(CView        *anEnclosure,
*aSupervisor,                                                   CBureaucrat
tail,                                                           Point
head,                                                           Point
*theOwner)
{
        CDrawable::IDrawable(anEnclosure,aSupervisor,head.h-tail.h+2*kMargin,
                                        ABS(head.v-tail.v)+2*kMargin,
                                        tail.h-kMargin, MIN(head.v,tail.v)-kMargin,theOwner);
        itsTail = tail;
        itsHead = head;
} void        CDrawableArrow::Draw(Rect *area)
{
        double  ratio;
        double  theta,theta1,theta2;
        PenSize(2,2);
        ratio = ((double)(itsHead.v-itsTail.v))/((double)(itsHead.h-itsTail.h));
        theta = atan(ratio);
        theta1 = theta+kArrowAngle;
        theta2 = theta-kArrowAngle;
        if (itsTail.v>itsHead.v) {
                MoveTo(kMargin,ABS(itsHead.v-itsTail.v)+kMargin);
                LineTo(itsHead.h-itsTail.h+kMargin,kMargin);
                LineTo(((double)itsHead.h-itsTail.h+kMargin)-
                                        2.0/3.0*((double)kGridSize)*cos(theta1),
                                ((double)kMargin)-
                                        2.0/3.0*((double)kGridSize)*sin(theta1));
                MoveTo(itsHead.h-itsTail.h+kMargin,kMargin);
                LineTo(((double)itsHead.h-itsTail.h+kMargin)-
                                        2.0/3.0*((double)kGridSize)*cos(theta2),
                                ((double)kMargin)-
                                        2.0/3.0*((double)kGridSize)*sin(theta2));
        }
        else {
                MoveTo(kMargin,kMargin);
                LineTo(itsHead.h-itsTail.h+kMargin,ABS(itsHead.v-itsTail.v)+kMargin);
                LineTo(((double)itsHead.h-itsTail.h+kMargin)-
                                        2.0/3.0*((double)kGridSize)*cos(theta1),
                                ((double)ABS(itsHead.v-itsTail.v)+kMargin)-
                                        2.0/3.0*((double)kGridSize)*sin(theta1));
                MoveTo(itsHead.h-itsTail.h+kMargin,ABS(itsHead.v-itsTail.v)+kMargin);
                LineTo(((double)itsHead.h-itsTail.h+kMargin)-
                                        2.0/3.0*((double)kGridSize)*cos(theta2),
                                ((double)ABS(itsHead.v-itsTail.v)+kMargin)-
                                        2.0/3.0*((double)kGridSize)*sin(theta2));
        }
        PenNormal();
}

Boolean     CDrawableArrow::HitHead(Point        thePoint)
{
        return (EqualPt(thePoint,GetHead()));
}

Boolean     CDrawableArrow::HitTail(Point        thePoint)
{
        return (EqualPt(thePoint,GetTail()));
} void        CDrawableArrow::Dispose()
{
        inherited::Dispose();
}

Point       CDrawableArrow::GetHead()
{
        return(itsHead);
}
Point       CDrawableArrow::GetTail()
{
        return(itsTail);
}
void        CDrawableArrow::SetHead(Point ahead)
{
        Rect    delta;
        short   newwidth,newheight,newhEncl,newvEncl;
        Boolean wasVisible = visible;
        if (visible)
                Hide();
        ahead.h = MAX(ahead.h,itsTail.h+kGridSize);
        itsHead = ahead;
        newwidth = itsHead.h-itsTail.h+2*kMargin;
        newheight = ABS(itsHead.v-itsTail.v)+2*kMargin;
        newhEncl = itsTail.h-kMargin;
        newvEncl = MIN(itsHead.v,itsTail.v)-kMargin;
        delta.top = newvEncl-vEncl;
        delta.left = newhEncl- hEncl;
        delta.bottom = newheight - height + delta.top;
        delta.right = newwidth-width + delta.left;
```

-23-

Appendix "A"

```
                ChangeSize(&delta,FALSE);
                Place(newhEncl,newvEncl,FALSE);
                if (wasVisible)
                        Show();
        }
void            CDrawableArrow::SetTail(Point atail)
{
        Rect    delta;
        short   newwidth,newheight,newhEncl,newvEncl;
        Boolean wasVisible = visible;
        if (visible)
                Hide();
        atail.h = MIN(atail.h,itsHead.h-kGridSize);
        itsTail = atail;
        newwidth = itsHead.h-itsTail.h+2*kMargin;
        newheight = ABS(itsHead.v-itsTail.v)+2*kMargin;
        newhEncl = itsTail.h-kMargin;
        newvEncl = MIN(itsHead.v,itsTail.v)-kMargin;
        delta.top = newvEncl-vEncl;
        delta.left = newhEncl- hEncl;
        delta.bottom = newheight - height + delta.top;
        delta.right = newwidth-width + delta.left;
        ChangeSize(&delta,FALSE);
        Place(newhEncl,newvEncl,FALSE);
        if (wasVisible)
                Show();
}
```

Appendix "A"

```
/*This file is called: "CDrawableArrow.h"*/
#pragma once
#include "CDrawable.h"                              /* Interface for its superclass   */
#define kArrowAngle (atan(3.0/4.0))
#define kMargin 10
class CDrawableArrow : public CDrawable {           /* Class Declaration              */
        void        IDrawableArrow(CView       *anEnclosure,    CBureaucrat
*aSupervisor,
                                                                Point
tail,
                                                                Point
head,                                                           CChunk
*theOwner);
        void        Dispose();
        virtual void    Draw(Rect *area);
        virtual Boolean HitHead(Point  thePoint);
        virtual Boolean HitTail(Point  thePoint);
        Point       GetHead();
        Point       GetTail();
        void        SetHead(Point head);
        void        SetTail(Point tail);
        Point       itsHead,itsTail;
};
```

-25-

Appendix "A"

```
/*This file is called: "CDrawableEffect.cp"*/
#include "CDrawableEffect.h"
#include "CMyIcon.h"
void        CDrawableEffect::IDrawableEffect(CView        *anEnclosure,
*aSupervisor,                                              CBureaucrat
origin,                                                    Point
*theOwner)                                                 CChunk
{
        CDrawableNode::IDrawableNode(anEnclosure,aSupervisor,
        itsIcon = new(CMyIcon);                            origin,theOwner);
        itsIcon->IMyIcon(this,aSupervisor,kGridSize+2,0,141);
}
```

Appendix "A"

```
/*This file is called: "CDrawableEffect.h"*/
#pragma once
#include "CDrawableNode.h"        /* Interface for its superclass
    */
class CDrawableEffect : public CDrawableNode {     /* Class Declaration
    void         IDrawableEffect(CView      *anEnclosure,
*aSupervisor,                                   CBureaucrat
origin,                                         Point
*theOwner);                                     CChunk
};
```

-27-

Appendix "A"

```
/*This file is called: "CDrawableFilter.cp"*/
#include "CDrawableFilter.h"
#include "CMyIcon.h"
void        CDrawableFilter::IDrawableFilter(CView       *anEnclosure,
*aSupervisor,                                             CBureaucrat
origin,                                                   Point
*theOwner)                                                CChunk
{
        CDrawableNode::IDrawableNode(anEnclosure,aSupervisor,
        numInputs=1;                                origin,theOwner);
        numOutputs=1;
        itsIcon = new(CMyIcon);
        itsIcon->IMyIcon(this,aSupervisor,KGridSize+2,0,142);
}
```

-28-

Appendix "A"

```
/*This file is called: "CDrawableFilter.h"*/
#pragma once
#include "CDrawableNode.h"            /* Interface for its superclass
    */
class CDrawableFilter : public CDrawableNode {    /* Class Declaration
    void           IDrawableFilter(CView            *anEnclosure,                    *
*aSupervisor,                                      CBureaucrat
origin,                                            Point
*theOwner);                                        CChunk
};
```

-29-

Appendix "A"

```
/*This file is called: "CDrawableNode.cp"*/
#include "CMyIcon.h"
#include "CDrawableNode.h"
#include "CPaneBorder.h"
#include "LongQD.h"
#include "extras.h"
#include "CMyEditText.h"

void        CDrawableNode::IDrawableNode(CView        *anEnclosure,
                                                      CBureaucrat
*aSupervisor,
origin,                                               Point
*theOwner)                                            CChunk
{
        CPaneBorder *thePaneBorder;
        CDrawable::IDrawable(anEnclosure,aSupervisor,
                                kNodeWidth*kGridSize,(kNodeHeight+1)*kGridSize,
                                origin.h, origin.v,theOwner);
        itsText = new(CMyEditText);
        itsText->IMyEditText(this,this,kNodeWidth*kGridSize-5,
                                12,2,(kNodeHeight)*kGridSize,
                                sizPIXEDSTICKY,sizPIXEDSTICKY,-1);
        itsText->editable = FALSE;
        itsText->SetCanBeGopher(FALSE);
        itsText->SetWantsClicks(FALSE);
        itsText->SetFontSize(9);
        itsText->SetAlignment(teCenter);
        itsText->SetFontStyle(condense);
        itsText->SetFontName("\pGeneva");
        itsText->SetTextPtr("Untitled",8);
        numInputs=2;
        numOutputs=1;
}
Point       CDrawableNode::GetTopLeft()
{
        Point thePoint;
        thePoint.h = hEncl;
        thePoint.v = vEncl;
        return(thePoint);
}
void        CDrawableNode::SetTopLeft(Point aOri)
{
        Place(aOri.h,aOri.v,FALSE);

}
short       CDrawableNode::GetLeft()
{
        return(hEncl);
}
short       CDrawableNode::GetRight()
{
        return(hEncl+width);
} void DrawKnob(x,y)
{
        Rect r;
        SetRect(&r,x-1,y-1,x+1,y+1);
        PaintRect(&r);
}
void        CDrawableNode::Draw(Rect *area)
{
        short   vertical;
        short   k;
        vertical = kGridSize;
        for (k=0;k<numInputs;k++,vertical+=kGridSize) {
                MoveTo(0,vertical);
                LineTo(itsIcon->GetLeft(),vertical);
        }
        vertical = kGridSize;
        for (k=0;k<numOutputs;k++,vertical+=kGridSize) {
                MoveTo(width,vertical);
                LineTo(itsIcon->GetRight(),vertical);
        }
        if (Selected) {
                DrawKnob(1,height-1);
                DrawKnob(width-1,height-1);
                DrawKnob(1,1);
                DrawKnob(width-1,1);
        }
}
void        CDrawableNode::ToggleSelection()
{
        Hide();
        Selected = !Selected;
        Show();
}
Boolean     CDrawableNode::Hit(Point        thePoint)
{
        LongPt  theLPoint;
        QDToLongPt(thePoint,&theLPoint);
        EnclToFrame(&theLPoint);
        itsIcon->EnclToFrame(&theLPoint);
        return (PtInLongRect(&theLPoint, &itsIcon->aperture));
```

-30-

Appendix "A"

```
}
Boolean       CDrawableNode::HitInput(Point          thePoint)
{
        return(HitInput1(thePoint)||HitInput2(thePoint));
}
Boolean       CDrawableNode::HitInput1(Point         thePoint)
{
        LongPt  theLPoint;
        QDToLongPt(thePoint,&theLPoint);
        EnclToFrame(&theLPoint);
        if (numInputs == 0)
                return (FALSE);
        if (numInputs >0) {
                if ((theLPoint.h == 0)&&(theLPoint.v == kGridSize)) {
                        return (TRUE);
                }
        }
        return(FALSE);
}
Boolean       CDrawableNode::HitInput2(Point         thePoint)
{
        LongPt  theLPoint;
        QDToLongPt(thePoint,&theLPoint);
        EnclToFrame(&theLPoint);
        if (numInputs == 0)
                return (FALSE);
        if (numInputs==2) {
                if ((theLPoint.h == 0)&&(theLPoint.v == 2*kGridSize)) {
                        return (TRUE);
                }
        }
        return(FALSE);
}
Boolean       CDrawableNode::HitOutput(Point         thePoint)
{
        LongPt  theLPoint;
        QDToLongPt(thePoint,&theLPoint);
        EnclToFrame(&theLPoint);
        if (numOutputs ==1) {
                if ((theLPoint.h == width)&&(theLPoint.v == kGridSize)) {
                        return (TRUE);
                }
        }
        return(FALSE);
}
void          CDrawableNode::Dispose()
{
        inherited::Dispose();
}
```

Appendix "A"

```
/*This file is called: "CDrawableNode.h"*/
#pragma once
#include "CDrawable.h"
CLASS     CMyIcon;                                        /* Interface for its superclass      */
#define kNodeWidth 5
#define kNodeHeight 3
CLASS     CMyDLOGDir;
CLASS     CMyEditText;

class CDrawableNode : public CDrawable {              /* Class Declaration                    */
        void        IDrawableNode(
                                      CView          *anEnclosure,
                                      CBureaucrat    *aSupervisor,
                                      Point          origin,
                                      CChunk         *theOwner);
        void        Dispose();
        virtual Boolean   Hit(Point          thePoint);
        virtual Boolean   HitInput2(Point    thePoint);
        virtual Boolean   HitInput1(Point    thePoint);
        virtual Boolean   HitInput(Point     thePoint);
        virtual Boolean   HitOutput(Point    thePoint);
        virtual void      Draw(Rect *area);
        virtual void      ToggleSelection();
        void        SetTopLeft(Point head);
        short       GetLeft();
        short       GetRight();
        Point       GetTopLeft();
        Boolean     Selected;
private:
        CMyIcon       *itsIcon;
        CMyDLOGDir    *itsDiaglog;
        CMyEditText   *itsText;
        short         numInputs;
        short         numOutputs;
};
```

-32-

Appendix "A"

```
/*This file is called: "CDrawableSink.cp"*/
#include "CDrawableSink.h"
#include "CMyIcon.h"
void        CDrawableSink::IDrawableSink(CView   *anEnclosure,
*aSupervisor,                                    CBureaucrat
origin,                                          Point
*theOwner)                                       CChunk )
{
        CDrawableNode::IDrawableNode(anEnclosure,aSupervisor,
                                            origin,theOwner);
        numInputs=1;
        numOutputs=0;
        itsIcon = new(CMyIcon);
        itsIcon->IMyIcon(this,aSupervisor,kGridSize+2,0,143);
}
```

Appendix "A"

```
/*This file is called: "CDrawableSink.h"*/
#pragma once
#include "CDrawableNode.h"
*/
class CDrawableSink : public CDrawableNode {
    void          IDrawableSink(CView
*aSupervisor, origin,

*theOwner);
};
```

/* Interface for its superclass
/* Class Declaration
    *anEnclosure,      CBureaucrat Point CChunk

-34-

Appendix "A"

```
/*This file is called: "CDrawableSource.cp"*/
#include "CDrawableSource.h"
#include "CMyIcon.h"
void        CDrawableSource::IDrawableSource(CView    *anEnclosure,    CBureaucrat
*aSupervisor,                                                          Point
origin,                                                                CChunk
*theOwner)
{
        CDrawableNode::IDrawableNode(anEnclosure,aSupervisor,  origin,theOwner);
        numInputs=0;
        numOutputs=1;
        itsIcon = new(CMyIcon);
        itsIcon->IMyIcon(this,aSupervisor,kGridSize+2,0,140);
}
```

Appendix "A"

```
/*This file is called: "CDrawableSource.h"*/
#pragma once
#include "CDrawableNode.h"             /* Interface for its superclass
*/
class CDrawableSource : public CDrawableNode {     /* Class Declaration              */
        void        IDrawableSource(CView   *anEnclosure,
*aSupervisor,                                      CBureaucrat
origin,                                            Point
*theOwner);                                        CChunk
};
```

Appendix "A"

```
/*This file is called: "CEffectDir.cp"*/
#include "CEffectDir.h"
#include "CMyDLOGDir.h"
#include "CDLOGEffect.h"
#include "CDecorator.h"
#include "CDesktop.h"
#include "CMoviePane.h"
#include "CTestBar.h"
#include "CFrameNumber.h"
extern   CDecorator *gDecorator;
extern   CDesktop *gDesktop;
define  kEffectDLOG              131 void CEffectDir::IEffectDir(CDirectorOwner *aSupervisor)
{
        short k;
        CMoviePane      *theMoviePane1,*theMoviePane2;
        CTestBar *theTestBar;
        CFrameNumber *theFrameNumber;

CMyDLOGDir::IMyDLOGDir(kEffectDLOG, aSupervisor);
        theMoviePane1 = new(CMoviePane);
        theMoviePane1->IMoviePane(itsWindow,this,40,115,NULL);
        theMoviePane2 = new(CMoviePane);
        theMoviePane2->IMoviePane(itsWindow,this,270,115,NULL);
}
```

Appendix "A"

```
/*This file is called: "CEffectDir.h"*/
#pragma once
#include "CMyDLOGDir.h"
class CEffectDir : public CMyDLOGDir
{
        void IEffectDir(CDirectorOwner *aSupervisor);
};
```

-38-

Appendix "A"

```
/*This file is called: "CEffectNode.cp"*/
#include "CEffectNode.h"
#include "CDrawableEffect.h"
#include "CEffectDir.h"
#include "CDialogText.h"
#include "CMyEditText.h"
#include "CMyDLOG.h"

void        CEffectNode::IEffectNode(CView          *anEnclosure,
                                      CBureaucrat   *aSupervisor,
                                      Point origin)
{
        CNode::INode();
        itsDrawable = (CDrawableEffect *) new(CDrawableEffect);
        ((CDrawableEffect *) itsDrawable)->IDrawableEffect(anEnclosure,
aSupervisor,origin,this);
        this->DependUpon(itsDrawable);
        itsDialog = (CMyDLOGDir *) new(CEffectDir);
        ((CEffectDir *)itsDialog)->IEffectDir(this);
}
void        CEffectNode::Dispose()
{
        itsDialog->Dispose();
        itsDrawable->Dispose();
        inherited::Dispose();
}
void        CEffectNode::Open()
{
        CDialogText *theText;
        Str255   theStr;
        Cancelled = FALSE;

theText = (CDialogText *)(((CMyDLOG *)(itsDialog->itsWindow))->FindViewByID(4));
        (((CDrawableNode *)itsDrawable)->itsText)->GetTextString(theStr);
        theText->SetTextString(theStr);

inherited::Open();

if (!Cancelled) {
                theText->GetTextString(theStr);
                (((CDrawableNode *)itsDrawable)->itsText)->SetTextString(theStr);
        }
}
```

Appendix "A"

```
/*This file is called: "CEffectNode.h"*/
#pragma once
#include "CNode.h"
class CEffectNode : public CNode {
        void            IEffectNode(CView            /* Interface for its superclass     */
                                /* Class Declaration
                                            *anEnclosure,
                                    CBureaucrat         *aSupervisor,
                                    Point origin);
        virtual void    Open();
        void            Dispose();
};
```

-40-

Appendix "A"

```
/*This file is called: "CFilterDir.cp"*/
#include "CFilterDir.h"
#include "CMyDLOGDir.h"
#include "CDLOGFilter.h"
#include "CDecorator.h"
#include "CDesktop.h"
#include "CDesktop.h"
#include "CMoviePane.h"
#include "CTestBar.h"
#include "CFrameNumber.h"
extern  CDecorator *qDecorator;
extern  CDesktop *gDesktop;
#define kFilterDLOG         132
extern  CDecorator *qDecorator;
extern  CDesktop *gDesktop;

void CFilterDir::IFilterDir(CDirectorOwner *aSupervisor)
{
        CMoviePane      *theMoviePane;
        CMyDLOGDir::IMyDLOGDir(kFilterDLOG, aSupervisor);
        theMoviePane = new(CMoviePane);
        theMoviePane->IMoviePane(itsWindow,this,157,115,NULL);
}
```

Appendix "A"

```
/*This file is called: "CFilterDir.h"*/
#pragma once
#include "CMyDLOGDir.h"
class CFilterDir : public CMyDLOGDir
{
        void IFilterDir(CDirectorOwner *aSupervisor);
};
```

Appendix "A"

```
/*This file is called: "CFilterNode.cp"*/
#include "CFilterNode.h"
#include "CDrawableFilter.h"
#include "CFilterDir.h"
#include "CDialogText.h"
#include "CMyEditText.h"
#include "CMyDLOG.h"
void         CFilterNode::IFilterNode(CView              *anEnclosure,
                                      CBureaucrat        *aSupervisor,
                                      Point origin)
{
    CNode::INode();
    itsDrawable = (CDrawableFilter *) new(CDrawableFilter);
    ((CDrawableFilter *) itsDrawable)->IDrawableFilter(anEnclosure,
aSupervisor,origin,this);
    this->DependUpon(itsDrawable);
    itsDialog = (CMyDLOGDir *) new(CFilterDir);
    ((CFilterDir *)itsDialog)->IFilterDir(this);

}
void         CFilterNode::Dispose()
{
    itsDialog->Dispose();
    itsDrawable->Dispose();
    inherited::Dispose();
}
void         CFilterNode::Open()
{
    CDialogText *theText;
    Str255  theStr;
    Cancelled = FALSE;

theText = (CDialogText *)(((CMyDLOG *)(itsDialog->itsWindow))->FindViewByID(4));
    (((CDrawableNode *)itsDrawable)->itsText)->GetTextString(theStr);
    theText->SetTextString(theStr);

inherited::Open();

if (!Cancelled) {
            theText->GetTextString(theStr);
            (((CDrawableNode *)itsDrawable)->itsText)->SetTextString(theStr);
    }
}
```

-43-

Appendix "A"

```
/*This file is called: "CFilterNode.h"*/
#pragma once
#include "CNode.h"
class CFilterNode : public CNode {
        void            IFilterNode(CView    /* Class Declaration    /* Interface for its superclass    */
                                                    *anEnclosure,
        void        Dispose();                      CBureaucrat       *aSupervisor,
        virtual void Open();                        Point origin);
};
```

-44-

Appendix "A"

```cpp
/*This file is called: "CFrameNumber.cp"*/
#include "CFrameNumber.h"
#include "CMyEditText.h"
#include "CPicture.h"
#include "CPaneBorder.h"
#include "CWindow.h"
#include "extras.h"
#include "stdio.h"
#include "time.h"
#include "string.h"
#include "CMoviePane.h"

void CFrameNumber::IFrameNumber( CView *anEnclosure, CBureaucrat *aSupervisor,
                                 short aHEncl, short aVEncl, char *text)
{
    CPane::IPane( anEnclosure, aSupervisor, 74, 11, aHEncl, aVEncl,
                  sizFIXEDSTICKY, sizFIXEDSTICKY);

itsTitle = new(CMyEditText);
    itsTitle->IMyEditText(anEnclosure,aSupervisor,60,20,
                aHEncl,aVEncl-15,sizFIXEDSTICKY,sizFIXEDSTICKY,-1);
    itsTitle->SetCanBeGopher(FALSE);
    itsTitle->SetWantsClicks(FALSE);
    itsTitle->SetFontSize(10);
    itsTitle->SetFontStyle(bold);
    itsTitle->SetFontName("\pGeneva");
    itsTitle->SetTextPtr(text,strlen(text));

itsText = new(CMyEditText);
    itsText->IMyEditText(this,this,50,16,0,0,sizFIXEDSTICKY, sizFIXEDSTICKY,-1);
    itsText->editable = FALSE;
    itsText->SetCanBeGopher(FALSE);
    itsText->SetWantsClicks(FALSE);
    itsText->SetFontSize(10);
    itsText->SetFontStyle(normal);
    itsText->SetFontName("\pTimes");
    itsText->SetTextPtr("00:00:00:00",11);
    Rect r;
    r.top = r.left = r.right = 0;
    r.bottom = -4;
    itsText->ChangeSize(&r,FALSE);
    itsBorder = new(CPaneBorder);
    itsBorder->IPaneBorder(kBorderFrame);
    r.bottom = 0;
    itsBorder->SetMargin(&r);
    this->SetBorder(itsBorder);
    itsPicture = new(CPicture);
    itsPicture->IPicture(this,this,24,12,50,-1,sizFIXEDSTICKY, sizFIXEDSTICKY);
    itsPicture->UsePICT(128);
    SetWantsClicks(TRUE);

SetMaxFrameNumber(200000);
    SetFPS(60);
    SetFrameNumber(0);
} /* CFrameNumber::IFrameNumber */

Boolean CFrameNumber::UpRegion(Point hitPt)
{
    if (hitPt.h<50)
        return(FALSE);
    if (hitPt.h>63)
        return(TRUE);
    return(FALSE);
}

Boolean CFrameNumber::DownRegion(Point hitPt)
{
    if (hitPt.h<50)
        return(FALSE);
    if (hitPt.h<63)
        return(TRUE);
    return(FALSE);
} void CFrameNumber::DoClick(     Point           hitPt,
                                                        short           modifierKeys,
                                                        long            when)
{
    double frameFloat,delta = 0.000000000001,sign;
    long oldclk,count=0;
    frameFloat = GetFrameNumber();
    if (!(UpRegion(hitPt)||DownRegion(hitPt)))
        return;
    if (UpRegion(hitPt)) {
        itsPicture->UsePICT(129);
        frameFloat+=1.0;
        sign = 1.0;
    }
    if (DownRegion(hitPt)) {
        itsPicture->UsePICT(130);
        frameFloat-=1.0;
        sign = -1.0;
    }
    itsPicture->Refresh();
    GetWindow()->Update();
    itsText->Prepare();
    oldclk = clock();
    do {
        count= clock()-oldclk;
        delta = delta + sign*(0.01*((float)count) + (float(count))*(float(count))*
```

Appendix "A"

```
                                                                  (float(count))*(float(count))*
(float(count))*(float(count))/200000000000000.0);
            frameFloat = MAX(0,frameFloat);
            SetFrameNumber(frameFloat+0.5);
            ((CMoviePane *)itsEnclosure)->UpdateBar();
            frameFloat+=delta;
      } while (StillDown());
      itsPicture->DasPICT(128);
      itsPicture->Refresh();
} void    CFrameNumber::SetFrameNumber(long number)
{
      char time[12];
      short hours,mins,secs,frames;
      if (number == -1)
            number = maxFrameNumber;

number = MIN(maxFrameNumber,number);
      number = MAX(minFrameNumber,number);

if (number!=frameNumber) {
            frameNumber = number;
            hours = frameNumber/(3600*fps);
            mins = (frameNumber-hours*3600*fps)/(60*fps);
            secs = (frameNumber-hours*3600*fps - mins*60*fps)/(fps);
            frames = (frameNumber-hours*3600*fps - mins*60*fps - secs*fps);
            sprintf(time,"%02.2d:%02.2d:%02.2d:%02.2d",hours,mins,secs,frames);
            itsText->SetTextPtr(time,11);
            itsText->Prepare();
      }
} void    CFrameNumber::SetMaxFrameNumber(long number)
{
      if (number==-1)
            number = ((CMoviePane *)itsEnclosure)->itsFrameCtl->maxFrameNumber;
      maxFrameNumber = number;
      SetFrameNumber(frameNumber);
} void    CFrameNumber::SetMinFrameNumber(long number)
{
      minFrameNumber = number;
      SetFrameNumber(frameNumber);
} void    CFrameNumber::SetFPS(short number)
{
      fps = number;
      long old;
      old = frameNumber;
      SetFrameNumber(0);
      SetFrameNumber(old);                    //Force a redraw
}
long    CFrameNumber::GetFrameNumber()
{
      return(frameNumber);
} void CFrameNumber::Dispose()
{
      itsTitle->Dispose();
      itsBorder->Dispose();
      itsText->Dispose();
      itsPicture->Dispose();
      inherited::Dispose();
}
```

-46-

Appendix "A"

```
/*This file is called: "CFrameNumber.h"*/
#pragma once
#include "CPane.h"
CLASS CMyEditText;
CLASS CPicture;
CLASS CPaneBorder;

class CFrameNumber : public CPane
{
        void IFrameNumber( CView *anEnclosure, CBureaucrat *aSupervisor,
                                short aHEncl, short aVEncl,char *);
        virtual void    SetFrameNumber(long);
        virtual void    SetMaxFrameNumber(long);
        virtual void    SetMinFrameNumber(long);
        virtual void    SetFPS(short);
        virtual long    GetFrameNumber();
        virtual void    DoClick(         Point          hitPt,
                                                        short          modifierKeys,
                                                        long           when);
        Boolean UpRegion(Point hitPt);
        Boolean DownRegion(Point hitPt);
        virtual void Dispose();
        short fps;
        long  maxFrameNumber,minFrameNumber,frameNumber;
        CMyEditText *itsText,*itsTitle;
        CPicture *itsPicture;
        CPaneBorder *itsBorder;
};
```

Appendix "A"

```
/*This file is called: "CLink.cp"*/
#include "CLink.h"
#include "CDrawableArrow.h"
void        CLink::ILink(CView               *anEnclosure,
                                             CBureaucrat            *aSupervisor,
                                             Point atail, Point ahead)
{
        CChunk::IChunk();
        itsDrawable = (CDrawable *) new(CDrawableArrow);
        ((CDrawableArrow *) itsDrawable)->IDrawableArrow(anEnclosure,
aSupervisor,atail,ahead,this);
        itsInput=itsOutput=NULL;
} void        CLink::Dispose()
{
        itsDrawable->Dispose();
        inherited::Dispose();
} void        CLink::ProviderChanged(CCollaborator *aProvider, long reason, void* info)
{
} void        CLink::UpdateHeadConnection(CNode *theNode)
{
        itsOutput = theNode;
} void        CLink::UpdateTailConnection(CNode *theNode)
{
        itsInput = theNode;
}
```

-48-

Appendix "A"

```
/*This file is called: "CLink.h"*/
#pragma once
#include "CChunk.h"
#include "CDrawableArrow.h"                              /* Interface for its superclass    */
CLASS CNode;
class CLink : public CChunk {                /* Class Declaration
        void            ILink(CView          *anEnclosure,                                    */
                                             CBureaucrat       *aSupervisor,
                                             Point atail, Point ahead);
        void            Dispose();
        void            UpdateHeadConnection(CNode *theNode);
        void            UpdateTailConnection(CNode *theNode);
        void            ProviderChanged( CCollaborator *aProvider, long reason, void* info);
        CNode           *itsInput,*itsOutput;
};
```

Appendix "A"

```
/*This file is called: "CMoviePane.cp"*/
#include "CMoviePane.h"
#include "CQTPane.h"
#include "CPaneBorder.h"
#include "CFrameNumber.h"
#include "Movies.h"
#include "CSyncBar.h"
void    CMoviePane::IMoviePane(
        CView                   *anEnclosure,
        CBureaucrat             *aSupervisor,
        short                   aHEncl,
        short                   aVEncl,
        Movie                   theMovie)
{
        CPane::IPane( anEnclosure, aSupervisor, 166, 205, aHEncl, aVEncl,
                        sizFIXEDLEFT, sizFIXEDTOP);
        SetWantsClicks(TRUE);
        itsFrameCtl = new(CFrameNumber);
        itsFrameCtl->IFrameNumber(this,this,4,157,"Frame");
        itsStartCtl = new(CFrameNumber);
        itsStartCtl->IFrameNumber(this,this,4,190,"Start");
        itsStartCtl->SetFrameNumber(0);
        itsSynchCtl = new(CFrameNumber);
        itsSynchCtl->IFrameNumber(this,this,88,157,"Sync");
        itsEndCtl = new(CFrameNumber);
        itsEndCtl->IFrameNumber(this,this,88,190,"End");
        itsEndCtl->SetFrameNumber(MAXLONG);
        itsBorder = new(CPaneBorder);
        itsBorder->IPaneBorder(kBorderFrame);
        itsBorder->SetPenSize(1,1);
        itsQTPane = new(CQTPane);
        itsQTPane->IQTPane(this,this,160,135,3,3,theMovie);
        itsSyncBar = new(CSyncBar);
        itsSyncBar->ISyncBar(this,this,33,138);
} void    CMoviePane::Dispose( void)
{
        itsBorder->Dispose();
        itsSynchCtl->Dispose();
        itsQTPane->Dispose();
        inherited::Dispose();                   /* Pass message on to superclass */
} void    CMoviePane::DispatchClick(
        register EventRecord    *macEvent)      /* Mouse down event record              */
{
        CView                   *hitView;
        Point                   hitPt;          /* View in which mouse was clicked   */
        long                    hoff;           /* In Frame coords of the view hit   */
        long                    voff;

inherited::DispatchClick(macEvent);
        hitView = FindSubview(macEvent->where);
        if (!hitView)
                return;
        if (hitView==itsSyncBar) {
                itsSynchCtl->SetFrameNumber(itsSyncBar->GetPercent()*((double)itsSynchCtl->maxFrameNumber));
        }
} void    CMoviePane::UpdateBar()
{
        TimeRecord time;
        time.value.hi = 0;
        time.value.lo = itsFrameCtl->GetFrameNumber();
        time.scale = itsFrameCtl->fps;
        time.base = GetMovieTimeBase(itsQTPane->itsMovie);
        MCDoAction(itsQTPane->mc,mcActionGoToTime,&time);
        time.value.lo = itsStartCtl->GetFrameNumber();
        time.scale = itsStartCtl->fps;
        time.base = NULL; //GetMovieTimeBase(itsQTPane->itsMovie);
        MCDoAction(itsQTPane->mc,mcActionSetSelectionBegin,&time);
        time.value.lo = itsEndCtl->GetFrameNumber()-itsStartCtl->GetFrameNumber();
        time.scale = itsEndCtl->fps;
        time.base = NULL; //GetMovieTimeBase(itsQTPane->itsMovie);
        MCDoAction(itsQTPane->mc,mcActionSetSelectionDuration,&time);
        itsQTPane->Prepare();
        MCDoAction(itsQTPane->mc,mcActionDraw,macPort);

itsSyncBar->SetPercent((double)(itsSynchCtl->GetFrameNumber())/(double)(itsSynchCtl->maxFrameNumber));
        Rect dummy;
        itsSyncBar->Draw(&dummy);
}
```

-50-

Appendix "A"

```
/*This file is called: "CMoviePane.h"*/
#pragma once
#include "CPane.h"
#include "Movies.h"
CLASS CQTPane;
CLASS CPaneBorder;
CLASS CFrameNumber;
CLASS CSyncBar;
class CMoviePane : public CPane {                          /* Class Declaration
    */
    CQTPane  *itsQTPane;
    CSyncBar *itsSyncBar;
    CFrameNumber *itsSynchCtl,*itsEndCtl,*itsStartCtl,*itsFrameCtl;
    void    IMoviePane(CView           *anEnclosure,
                       CBureaucrat     *aSupervisor,
                       short           aHEncl,
                       short           aVEncl,
                       Movie           theMovie);
    virtual void    Dispose(void);
    virtual void    DispatchClick(register EventRecord     *macEvent);
    virtual void    UpdateBar(void);
};
```

-51-

Appendix "A"

```
/*This file is called: "CMultiApp.cp"*/
#include "CMultiApp.h"
#include "CMultiDoc.h"
#include "Movies.h"
#include "GestaltEqu.h"
#include "extras.h"
#include "CAboutBox.h"
extern   OSType   gSignature;
extern   CApplication *gApplication;
#define         kExtraMasters         4
#define         kRainyDayFund         20480
#define         kCriticalBalance      20480
#define         kToolboxBalance       20480
Boolean IsQuickTimeInstalled(void);
Boolean IsQuickTimeInstalled(void)
{
        short error;
        long result;
        error = Gestalt(gestaltQuickTime,&result);
        return (error==noErr);
} void CMultiApp::IMultiApp(void)

{
        CApplication::IApplication( kExtraMasters, kRainyDayFund,
                                         kCriticalBalance, kToolboxBalance);
        if (IsQuickTimeInstalled()) {
                FailOSErr(EnterMovies());
        }
        else {
                StopAlert(ALRTnoQT,NULL);
                gApplication->Exit();
                ExitToShell();
        }
} void    CMultiApp::DoCommand(
        long                   theCommand)
{
        CAboutBox      *theAboutBox;
        Str63          itemName;
        long           number;
        Style          aStyle;

if (theCommand < 0) {
                switch (HiShort(-theCommand)) {
                        default:
                                inherited::DoCommand(theCommand);
                }

} else {
                switch (theCommand) { case cmdAbout:
                                theAboutBox = new(CAboutBox);
                                theAboutBox->IAboutBox(this);
                                theAboutBox->Dispose();
                                FlushEvents(mDownMask+mUpMask+KeyDownMask+keyUpMask
                                                +autoKeyMask, 0);
                                break;
                        default:
                                inherited::DoCommand(theCommand);
                                break;
                }
        }
} void CMultiApp::SetUpFileParameters(void)

{
        inherited::SetUpFileParameters();        /* Be sure to call the default method */
        sfNumTypes = 1;
        sfFileTypes[0] = 'TEXT';
        gSignature = '?\??\?';
} void CMultiApp::SetUpMenus()
{
  inherited::SetUpMenus();
} void CMultiApp::UpdateMenus()
{
  inherited::UpdateMenus();       /* Enable standard commands */
} void CMultiApp::Exit()
{
} void CMultiApp::CreateDocument()

{
        CMultiDoc       *theDocument = NULL;
        TRY
        {
```

Appendix "A"

```
            theDocument = new(CMultiDoc);
            theDocument->IMultiDoc(this, TRUE);
            theDocument->NewFile();
        }
        CATCH
        {
            if (theDocument) theDocument->Dispose();
        }
        ENDTRY;
}

CLASS CButton;
CLASS CPicture;
CLASS CRadioControl;
CLASS CRadioGroupPane;
CLASS CEditText;
CLASS CMyEditText;
CLASS CIntegerText;
CLASS CStyleText;
CLASS CStdPopupPane;

void    CMultiApp::ForceClassReferences( void)
{
        Boolean alwaysFalse = FALSE;
        CObject *dummy = NULL;

if (alwaysFalse == TRUE)
        {
                member( dummy, CButton);
                member( dummy, CPicture);
                member( dummy, CRadioControl);
                member( dummy, CRadioGroupPane);
                member( dummy, CEditText);
                member( dummy, CMyEditText);
                member( dummy, CIntegerText);
                member( dummy, CStyleText);
                member( dummy, CStdPopupPane);
        }
} void CMultiApp::OpenDocument(SFReply *macSFReply)
{
        CMultiDoc       *theDocument = NULL;

TRY
        {
                theDocument = new(CMultiDoc);
                theDocument->IMultiDoc(this, TRUE);
                theDocument->OpenFile(macSFReply);
        }
        CATCH
        {
            if (theDocument) theDocument->Dispose();
        }
        ENDTRY;
}
```

-53-

Appendix "A"

```
/*This file is called: "CMultiApp.h"*/
#define _H_CMultiApp
#include "CApplication.h"        /* Include this file only once */
struct CMultiApp : CApplication {
        void    IMultiApp(void);
        void    SetUpFileParameters(void);

void    SetUpMenus(void);
    void    UpdateMenus(void);

void    DoCommand(long theCommand);
    void        ForceClassReferences( void);
        void    Exit(void);
        void    CreateDocument(void);
        void    OpenDocument(SFReply *macSFReply);
};
```

-54-

Appendix "A"

```
/*This file is called: "CMultiDoc.cp"*/
#include "Global.h"
#include "Commands.h"
#include "CApplication.h"
#include "CBartender.h"
#include "CDataFile.h"
#include "CDecorator.h"
#include "CDesktop.h"
#include "CError.h"
#include "CPanorama.h"
#include "CScrollPane.h"
#include "CMyCharGrid.h"
#include "CPaneBorder.h"
#include "CLink.h"
#include "CSourceNode.h"
#include "CEffectNode.h"
#include "CFilterNode.h"
#include "CSinkNode.h"
#include "CMultiDoc.h"
#include "CMultiPane.h"
#include "TBUtilities.h"
#include "CWindow.h"
#include <Packages.h>
#include "extras.h"
#include "CDragNode.h"
#include "CDrawableNode.h"

extern  CApplication  *gApplication;   /* The application */
extern  CBartender    *gBartender;     /* The menu handling object */
extern  CDecorator    *gDecorator;     /* Window dressing object     */
extern  CDesktop      *gDesktop;       /* The enclosure for all windows */
extern  CBureaucrat   *gGopher;        /* The current boss in the chain of command */
extern  OSType        gSignature;      /* The application's signature */
extern  CError        *gError;         /* The global error handler */ void CMultiDoc::IMultiDoc(CApplication *aSupervisor, Boolean printable)
{
        CDocument::IDocument(aSupervisor, printable);
} void CMultiDoc::Dispose()
{
        inherited::Dispose();
} void CMultiDoc::DoCommand(long theCommand)
{
        LongPt             trackStart;
        Point              origin;
        CSourceNode        *aSourceNode;
        CEffectNode        *aEffectNode;
        CFilterNode        *aFilterNode;
        CSinkNode          *aSinkNode;
        CDragNode          *theTask;

if (theCommand < 0) {
                switch (HiShort(-theCommand)) {
                        case MENUtools:
                                origin.h = trackStart.h = ((CPanorama *)itsMainPane)->position.h;
                                origin.v = trackStart.v = ((CPanorama *)itsMainPane)->position.v;
                                switch (LoShort(-theCommand)) {
                                        case toolSOURCE:
                                                ((CMultiPane *)itsMainPane)->UnSelectAll();
                                                aSourceNode = new(CSourceNode);
                                                aSourceNode->ISourceNode(itsMainPane,this,origin);
                                                ( ( C  D  r  a  w  a  b  l  e  N  o  d  e
*)(aSourceNode->itsDrawable))->ToggleSelection();
                                                theTask = new(CDragNode);
                                                theTask->IDragNode((CMultiPane *)itsMainPane);
                                                itsMainPane->ForceNextPrepare();
                                                itsMainPane->Prepare();
                                                itsMainPane->TrackMouse(theTask,&trackStart,&(((CMultiPane
*)itsMainPane)->bounds));
                                                break;
                                        case toolEFFECT:
                                                ((CMultiPane *)itsMainPane)->UnSelectAll();
                                                aEffectNode = new(CEffectNode);
                                                aEffectNode->IEffectNode(itsMainPane,this,origin);
                                                ( ( C  D  r  a  w  a  b  l  e  N  o  d  e
*)(aEffectNode->itsDrawable))->ToggleSelection();
                                                theTask = new(CDragNode);
                                                theTask->IDragNode((CMultiPane *)itsMainPane);
                                                itsMainPane->ForceNextPrepare();
                                                itsMainPane->Prepare();
                                                itsMainPane->TrackMouse(theTask,&trackStart,&(((CMultiPane
*)itsMainPane)->bounds));
                                                break;
                                        case toolFILTER:
                                                ((CMultiPane *)itsMainPane)->UnSelectAll();
                                                aFilterNode = new(CFilterNode);
                                                aFilterNode->IFilterNode(itsMainPane,this,origin);
                                                ( ( C  D  r  a  w  a  b  l  e  N  o  d  e
*)(aFilterNode->itsDrawable))->ToggleSelection();
                                                theTask = new(CDragNode);
```

-55-

Appendix "A"

```
                                                    theTask->IDragNode((CMultiPane *)itsMainPane);
                                                    itsMainPane->ForceNextPrepare();
                                                    itsMainPane->Prepare();
                                                    itsMainPane->TrackMouse(theTask,&trackStart,&(((CMultiPane
*)itsMainPane)->bounds));
                                                    break;
                                        case toolSINK:
                                                    ((CMultiPane *)itsMainPane)->UnSelectAll();
                                                    aSinkNode = new(CSinkNode);
                                                    aSinkNode->ISinkNode(itsMainPane,this,origin);
*)(aSinkNode->itsDrawable))->ToggleSelection();      (  (  C   D   r   a   w   a   b   l   e   N   o   d   e
                                                    theTask = new(CDragNode);
                                                    theTask->IDragNode((CMultiPane *)itsMainPane);
                                                    itsMainPane->ForceNextPrepare();
                                                    itsMainPane->Prepare();
*)itsMainPane)->bounds));                           itsMainPane->TrackMouse(theTask,&trackStart,&(((CMultiPane
                                                    break;
                                    }
                                    break;
                            default:
                                    inherited::DoCommand(theCommand);
                    }
            } else {
                    switch (theCommand) {
                            default:
                                    inherited::DoCommand(theCommand);
                                    break;
                    }
            }
} void CMultiDoc::UpdateMenus()
{
    inherited::UpdateMenus();
} void CMultiDoc::NewFile(void)
{
    Str255      wTitle;     /* Window title string.          */
    short       wCount;     /* Index number of new window.   */
    Str255      wNumber;    /* Index number as a string.     */
    CLink       *aLink;
    Point       head,tail,origin;
    CSourceNode *aSourceNode;
            BuildWindow(NULL);
    itsChunkList = new(CList);
    itsChunkList->IList();
    tail.h = tail.v = kGridSize;
    head.h = head.v = kGridSize*20;
            tail.v = head.h = kGridSize*20;
    head.v = tail.h = kGridSize;
    origin.h = origin.v = kGridSize*7;
        aSourceNode = new(CSourceNode);
        aSourceNode->ISourceNode(itsMainPane,this,origin);
        itsChunkList->Append(aSourceNode);
    itsWindow->GetTitle(wTitle);
    wCount = gDecorator->GetWCount();
    NumToString(wCount, wNumber);
    ConcatPStrings(wTitle, (StringPtr) "\p ");
    ConcatPStrings(wTitle, wNumber);
    itsWindow->SetTitle(wTitle);
        itsWindow->Select();
} void CMultiDoc::OpenFile(SFReply *macSFReply)
{
        CDataFile       *theFile;
        Handle          theData = NULL;
        Str63           theName;
        OSErr           theError;

TRY
        {
                theFile = new(CDataFile);
                theFile->IDataFile();
                theFile->SFSpecify(macSFReply);
                itsFile = theFile;
                theFile->Open(fsRdWrPerm);
            theData = theFile->ReadAll();       /* ReadAll() creates the handle */
                BuildWindow(theData);
                DisposHandle(theData);
                theData = NULL;
                itsFile->GetName(theName);
                itsWindow->SetTitle(theName);
                itsWindow->Select();            /* Don't forget to make the window active */
        }
        CATCH
        {
                if (theData) DisposHandle( theData);
        }
        ENDTRY;
} void CMultiDoc::BuildWindow (Handle theData)
```

-56-

Appendix "A"

```
{
        CScrollPane        *theScrollPane;
        CMultiPane      *theMainPane;
        CMyCharGrid *theCharGrid;
        CPaneBorder *thePaneBorder;
        LongRect    interior;
        short    hOffset = 0;
        Rect     delta;
        Rect     theSize;
        itsWindow = new(CWindow);
        itsWindow->IWindow(WINDMulti, FALSE, gDesktop, this);
        theSize = itsWindow->sizeRect;
        theSize.top = 150;
        theSize.left = 200;
        itsWindow->SetSizeRect(&theSize);
    theScrollPane = new(CScrollPane);
        theScrollPane->IScrollPane(itsWindow, this, 10, 10, 0, 0,
                                                             sizELASTIC, sizELASTIC,
                                                             TRUE, TRUE, TRUE);
        theScrollPane->FitToEnclFrame(TRUE, TRUE);
        theScrollPane->SetSteps(20,20);
        theCharGrid = new(CMyCharGrid);
        theCharGrid->IMyCharGrid(GRIDMulti,itsWindow, this);
        thePaneBorder = new(CPaneBorder);
        thePaneBorder->IPaneBorder(kBorderRight+kBorderBottom);
        theCharGrid->SetBorder(thePaneBorder);
        thePaneBorder = new(CPaneBorder);
        thePaneBorder->IPaneBorder(kBorderLeft);
        theScrollPane->SetBorder(thePaneBorder);
        delta.left = delta.top = delta.right = delta.bottom = 0;
        delta.left = theCharGrid->width+2;
        theScrollPane->ChangeSize(&delta, FALSE);
        theMainPane = new(CMultiPane);
        theMainPane->IMultiPane(theScrollPane, this, 1300, 1300, 0, 0,
                                           sizELASTIC, sizELASTIC);
        itsMainPane = theMainPane;
        itsGopher = theMainPane;
        theMainPane->FitToEnclosure(TRUE, TRUE);
        theScrollPane->InstallPanorama(theMainPane);
        gDecorator->PlaceNewWindow(itsWindow);
}

Boolean CMultiDoc::DoSave(void)
{
        if (itsFile == NULL)
                return(DoSaveFileAs());
        else {
                dirty = FALSE;
                gBartender->DisableCmd(cmdSave);         /* Document is no longer dirty    */
                return(TRUE);                             /* Save was successful */
        */
        )
}

Boolean CMultiDoc::DoSaveAs(SFReply *macSFReply)
{
        if (itsFile != NULL)
                itsFile->Dispose();
        itsFile = new(CDataFile);
        ((CDataFile *)itsFile)->IDataFile();
        itsFile->SFSpecify(macSFReply);
        itsFile->CreateNew(gSignature, 'TEXT');
        itsFile->Open(fsRdWrPerm);
        itsWindow->SetTitle(macSFReply->fName);
        return( DoSave() );
} void CMultiDoc::DoRevert(void)
{
}
```

-57-

Appendix "A"

```cpp
/*This file is called: "CMultiPane.cp"*/
#include "CMultiPane.h"
#include "CDrawableArrow.h"
#include "CDrawableNode.h"
#include "CChunk.h"
#include "CLink.h"
#include "CNode.h"
#include "CMultiDoc.h"
#include "CMouseTask.h"
#include "CDragNewArrowHead.h"
#include "CDragNewArrowTail.h"
#include "CDragNode.h"
#include "extras.h"
extern short gClicks;

void CMultiPane::IMultiPane(CView *anEnclosure, CBureaucrat *aSupervisor,
                                                short aWidth, short aHeight,
                                                short aHEncl, short aVEncl,
                                                SizingOption aHSizing, SizingOption aVSizing)
{
        CPanorama::IPanorama(anEnclosure, aSupervisor, aWidth, aHeight,
                                                aHEncl, aVEncl, aHSizing, aVSizing);
        wantsClicks = TRUE;
} void DoDraw(CObject *theChunk)
                {
                        return(((CChunk *)theChunk)->Draw());
                } void CMultiPane::DoKeyDown(
        char            theChar,
        Byte            keyCode,
        EventRecord *macEvent)
{
        LongPt  thePosition;
        long    theHExtent, theVExtent;

switch (keyCode) { case KeyDelete:
                UnSelectAll();
                break;

default:
                inherited::DoKeyDown(theChar, keyCode, macEvent);
                break;
        }
}

CDrawableArrow* CMultiPane::FindHitHead(Point hitPt)
{
        short   numItems,k;
        CDrawable *theDrawable;
        numItems = itsSubviews->GetNumItems();
        if (numItems != 0)
        {
                for (theDrawable = (CDrawable *) itsSubviews->FirstItem(),k=1;
                                                k<=numItems;
                                                k++,theDrawable = (CDrawable *) itsSubviews->NthItem(k)) {
                        if (theDrawable->HitHead(hitPt))
                                        return((CDrawableArrow *)theDrawable);
                }
        }
        return(NULL);
}

CDrawableArrow* CMultiPane::FindHitTail(Point hitPt)
{
        short   numItems,k;
        CDrawable *theDrawable;
        numItems = itsSubviews->GetNumItems();
        if (numItems != 0)
        {
                for (theDrawable = (CDrawable *) itsSubviews->FirstItem(),k=1;
                                                k<=numItems;
                                                k++,theDrawable = (CDrawable *) itsSubviews->NthItem(k)) {
                        if (theDrawable->HitTail(hitPt))
                                        return((CDrawableArrow *)theDrawable);
                }
        }
        return(NULL);
}

CDrawableNode* CMultiPane::FindHitInput(Point hitPt)
{
        short   numItems,k;
        CDrawable *theDrawable;
        numItems = itsSubviews->GetNumItems();
        if (numItems != 0)
        {
                for (theDrawable = (CDrawable *) itsSubviews->FirstItem(),k=1;
                                                k<=numItems;
                                                k++,theDrawable = (CDrawable *) itsSubviews->NthItem(k)) {
                        if (theDrawable->HitInput(hitPt))
                                        return((CDrawableNode *)theDrawable);
                }
        }
}
```

-58-

Appendix "A"

```
        return(NULL);
}
CDrawableNode* CMultiPane::FindHitOutput(Point hitPt)
{
        short   numItems,k;
        CDrawable *theDrawable;
        numItems = itsSubviews->GetNumItems();
        if (numItems != 0)
        {
                for (theDrawable = (CDrawable *) itsSubviews->FirstItem(),k=1;
                                k<=numItems;
                                k++,theDrawable = (CDrawable *) itsSubviews->NthItem(k)) {
                        if (theDrawable->HitOutput(hitPt))
                                return((CDrawableNode *)theDrawable);
                }
        }
        return(NULL);
}

CDrawableNode* CMultiPane::FindHit(Point hitPt)
{
        short   numItems,k;
        CDrawable *theDrawable;
        numItems = itsSubviews->GetNumItems();
        if (numItems != 0)
        {
                for (theDrawable = (CDrawable *) itsSubviews->FirstItem(),k=1;
                                k<=numItems;
                                k++,theDrawable = (CDrawable *) itsSubviews->NthItem(k)) {
                        if (theDrawable->Hit(hitPt))
                                return((CDrawableNode *)theDrawable);
                }
        }
        return(NULL);
} void UnSelect(CObject *theObject)
{
        if (((CDrawableNode *)(theObject))->Selected) {
                ((CDrawableNode *)(theObject))->Hide();
                ((CDrawableNode *)(theObject))->Selected = FALSE;
                ((CDrawableNode *)(theObject))->Show();
        }
} void CMultiPane::UnSelectAll()
{
        itsSubviews->DoForEach(UnSelect);
} void CMultiPane::DoClick(Point hitPt, short modifierKeys, long when)
{
        CMouseTask        *theTask;
        Rect              bounds;
        Boolean           select = FALSE;
        Boolean           notifiable = TRUE;
        LongPt            trackStart;
        CDrawableArrow    *theDrawableArrow;
        CChunk            *theChunk;
        CDrawableNode     *theDrawableNode;
        int               k,numberOfChunks;

Boolean ShiftDown;

ShiftDown = /*((modifierKeys & shiftKey) > 0);*/FALSE;

LongToQDRect( &this->bounds, &bounds);

hitPt.h = ((short)((hitPt.h+kGridSize/4)/kGridSize))*kGridSize;
        hitPt.v = ((short)((hitPt.v+kGridSize/4)/kGridSize))*kGridSize;
        QDToLongPt( hitPt, &trackStart);

if (!PtInRect(hitPt, &bounds)) {
                return;
        } theDrawableArrow=FindHitHead(hitPt);
        if (theDrawableArrow) {
                theTask = new(CDragArrowHead);
                ((CDragArrowHead *)theTask)->IDragArrowHead(this,theDrawableArrow);
                ForceNextPrepare();
                Prepare();
                TrackMouse(theTask, &trackStart, &this->bounds);
                return;
        }
        theDrawableArrow=FindHitTail(hitPt);
        if (theDrawableArrow) {
                theTask = new(CDragArrowTail);
                ((CDragArrowTail *)theTask)->IDragArrowTail(this,theDrawableArrow);
                ForceNextPrepare();
                Prepare();
                TrackMouse(theTask, &trackStart, &this->bounds);
                return;
        }
        theDrawableNode=FindHit(hitPt);
        if (theDrawableNode) {
                if ((gClicks==2)&&(!ShiftDown)&&(theDrawableNode->Selected)) {
```

-59-

Appendix "A"

```
            //SysBeep(0);
            ((CNode *)(theDrawableNode->itsChunk))->Open();
            return;
        }
        theTask = new(CDragNode);
        ((CDragNode *)theTask)->IDragNode(this);
        ForceNextPrepare();
        Prepare();
        if (!ShiftDown) {
            UnSelectAll();
        }
        theDrawableNode->ToggleSelection();
        TrackMouse(theTask, &trackStart, &this->bounds);
        return;
    }
    theDrawableNode=FindHitInput(hitPt);
    if (theDrawableNode) {
        theTask = new(CDragNewArrowTail);
        ((CDragNewArrowTail *)theTask)->IDragNewArrowTail(this);
        ForceNextPrepare();
        Prepare();
        TrackMouse(theTask, &trackStart, &this->bounds);
        return;
    }
    theDrawableNode=FindHitOutput(hitPt);
    if (theDrawableNode) {
        theTask = new(CDragNewArrowHead);
        ((CDragNewArrowHead *)theTask)->IDragNewArrowHead(this);
        ForceNextPrepare();
        Prepare();
        TrackMouse(theTask, &trackStart, &this->bounds);
        return;
    }
    UnSelectAll();
}
void    CMultiPane::QDToFrame(
        Point           qdPt,
        LongPt          *framePt)
{
    Prepare();

if (usingLongCoord)
    {
        WindToFrame( qdPt, framePt);
        framePt->h -= thePort->portRect.left;
        framePt->v -= thePort->portRect.top;
    }
    else
        QDToLongPt( qdPt, framePt);

framePt->h = ((int)((framePt->h+kGridSize/4)/kGridSize))*kGridSize;
    framePt->v = ((int)((framePt->v+kGridSize/4)/kGridSize))*kGridSize;
}

Boolean CMultiPane::HitSamePart(Point pointA, Point pointB)
{
    SubPt(pointA,&pointB);
    return ((ABS(pointB.h)<kGridSize)&&(ABS(pointB.h)<kGridSize));
} void CMultiPane::AdjustCursor(Point where, RgnHandle mouseRgn)
{
    inherited::AdjustCursor(where, mouseRgn);
} void    CPaintPane::DoKeyDown(
        char            theChar,
        Byte            keyCode,
        EventRecord     *macEvent)
{
    if (theChar == DELETE_KEY) {
        theTask = new(CDeleteSelectionTask);
        theTask->IDeleteSelectionTask(this);
    }
    else
        inherited::DoKeyDown(theChar, keyCode, macEvent);
}
void CMultiPane::ScrollToSelection(void)
{
}
```

Appendix "A"

```
/*This file is called: "CMultiPane.h"*/
#pragma once
#include "CPanorama.h"          /* Include this file only once */
CLASS    CDrawableArrow;
CLASS    CDrawableNode;

struct CMultiPane : CPanorama {
        void            IMultiPane(CView *anEnclosure, CBureaucrat *aSupervisor,
                                        short aWidth, short aHeight,
                                        short aHEncl, short aVEncl,
                                        SizingOption aHSizing, SizingOption aVSizing);
        void            DoClick(Point hitPt, short modifierKeys, long when);
        Boolean         HitSamePart(Point pointA, Point pointB);
        void            UnSelectAll();
        virtual void DoKeyDown(char theChar,Byte keyCode,EventRecord *macEvent);
        void            AdjustCursor(Point where, RgnHandle mouseRgn);
        void            ScrollToSelection(void);
        void            QDToFrame(Point          qdPt,
                                                LongPt          *framePt);
        void            DoKeyDown(char          theChar,
                                                Byte            keyCode,
                                                EventRecord     *macEvent);
        CDrawableArrow* FindHitHead(Point hitPt);
        CDrawableArrow* FindHitTail(Point hitPt);
        CDrawableNode*  FindHitInput(Point hitPt);
        CDrawableNode*  FindHitOutput(Point hitPt);
        CDrawableNode*  FindHit(Point hitPt);
};
```

-61-

Appendix "A"

```
/*This file is called: "CMyCharGrid.cp"*/
#include "Global.h"
#include "CTextEnvirons.h"
#include "CMyCharGrid.h"
#include "TBUtilities.h"
#include "TCLUtilities.h"

typedef struct ChGdRec {                      /* Resource template for a       */
        short           rows;                 /*    character grid             */
        short           cols;
        short           boxWidth;
        short           boxHeight;
        short           hSizing;
        short           vSizing;
        short           hLoc;
        short           vLoc;
        short           commandBase;
        short           theSize;
        unsigned char   extra[1];
} ChGdRec, *ChGdPtr, **ChGdHand;

void    CMyCharGrid::IMyCharGrid(
        short           ChGdid,               /* ChGd resource ID              */
        CView           *anEnclosure,         /* Enclosing view                */
        CBureaucrat     *aSupervisor)         /* Boss in chain of command      */
{
        CCharGrid::ICharGrid(ChGdid,anEnclosure, aSupervisor);
} void    CMyCharGrid::DoClick(
        Point           hitPt,
        short           modifierKeys,
        long            when)
{
        short           itemHit,newHit;       /* Index no. of clicked item     */ itemHit = newHit = FindItem( hitPt );
        HiliteItem(itemHit,hiliteON);         /* Determine item clicked on     */
        while (newHit!=NOTHING) {
                GetMouse(&hitPt);
                newHit = FindItem( hitPt );   /* Determine item clicked on     */
        }
        HiliteItem(itemHit,hiliteOFF);
        itsSupervisor->DoCommand(-(((long)commandBase << 16) + itemHit));
} void    CMyCharGrid::Draw(
        Rect            *area)
{
        short           r;                    /* Row index                     */
        short           c;                    /* Column index                  */
        register short  theItem;              /* Item number                   */
        Rect            theBox;               /* Bounding box of item          */ if (gridOn)
                DrawGrid();                   /* Draw grid lines between items */ theItem = 0;                          /* Run thru and draw all items   */
        for (r = 1; r <= rows; r++) {
                for (c = 1; c <= columns; c++) {
                        theItem++;
                        FindItemBox(theItem, &theBox);
                        DrawItem(theItem, &theBox);
                }
        }
} void    CMyCharGrid::ChangeSelection(
        short   aSelection)
{
}
```

-62-

Appendix "A"

```
/*This file is called: "CMyCharGrid.h"*/
#pragma once
#include "CCharGrid.h"
class CMyCharGrid : public CCharGrid {/* Class Declaration    /* Interface for its superclass    */
    Handle          theCharacters;                             /* Characters within the grid    */
    void            IMyCharGrid(short ChGdid, CView *anEnclosure,
                                CBureaucrat *aSupervisor);
    virtual void    Draw(Rect *area);
    virtual void    ChangeSelection(short aSelection);
    virtual void    DoClick(Point hitPt,
                            short modifierKeys,
                            long when);
};
```

Appendix "A"

```
/*This file is called: "CMyDLOG.cp"*/
#include "CDLOGDialog.h"
#include "CMyDLOG.h"
#include "TCLUtilities.h"
void CMyDLOG::IMyDLOG( short DLOGid, CDesktop *anEnclosure,
                                     CDirector *aSupervisor)
{
        WCTabHandle     colorTable;
        OSErr    err;
        inherited::IDLOGDialog(DLOGid,anEnclosure,aSupervisor);
        colorTable = (WCTabHandle)GetResourceCanFail( 'dctb', DLOGid );
        err = ResError();
        HNoPurge( (Handle) colorTable );
        if (err == noErr)         {
                if (macPort) SetWinColor( macPort, colorTable );
        }       else if (err != resNotFound)    {
                Failure( err, 0 );
        }
        HPurge( (Handle) colorTable );
}
```

Appendix "A"

```
/*This file is called: "CMyDLOG.h"*/
#pragma once
#include "CDLOGDialog.h"
class CMyDLOG: public CDLOGDialog
{
        void IMyDLOG( short DLOGid, CDesktop *anEnclosure,
                              CDirector *aSupervisor);
};
```

Appendix "A"

```
/*This file is called: "CMyDLOGDir.cp"*/
#include "CMyDLOG.h"
#include "CMyDLOGDir.h"
#include "Commands.h"
#include "CWindow.h"
CLASS CDesktop;
#include "CDecorator.h"
extern CDesktop *gDesktop;
extern CDecorator *gDecorator;

void CMyDLOGDir::IMyDLOGDir( short DLOGid,
                CDirectorOwner *aSupervisor)
{
        CMyDLOG *dialog;
        CDialogDirector::IDialogDirector( aSupervisor);
        dialog = new( CMyDLOG);
        itsWindow = dialog;
        dialog->IMyDLOG( DLOGid, gDesktop, this);
        gDecorator->CenterWindow( dialog);
} void CMyDLOGDir::TalkToUser(void)
{
        long    dismissCommand;
        BeginModalDialog();
        dismissCommand = DoModalDialog(cmdOK);
        itsWindow->Hide();
        if (dismissCommand == cmdOK)
        {
        }
}
```

Appendix "A"

```
/*This file is called: "CMyDLOGDir.h"*/
#pragma once
#include "CDLOGDirector.h"
class CMyDLOGDir: public CDLOGDirector
{
        void IMyDLOGDir( short DLOGid, CDirectorOwner *aSupervisor);
        void TalkToUser(void);
};
```

Appendix "A"

```
/*This file is called: "CMyEditText.cp"*/
#include "CMyEditText.h"
#include "Global.h"

void     CMyEditText::IMyEditText(
         CView                    *anEnclosure,
         CBureaucrat              *aSupervisor,
         short                    aWidth,
         short                    aHeight,
         short                    aHEncl,
         short                    aVEncl,
         SizingOption             aHSizing,
         SizingOption             aVSizing,
         short                    aLineWidth)
{
         CAbstractText::IAbstractText(anEnclosure, aSupervisor,
                           aWidth, aHeight, aHEncl, aVEncl, aHSizing, aVSizing,
                           aLineWidth);
         wholeLines = FALSE;
         IEditTextX();
} void CMyEditText::GetTextString( StringPtr aString)
{
         short length = Min( (**macTE).teLength, 255);

BlockMove( *(**macTE).hText, &aString[1], length);
         aString[0] = length;
} void     CMyEditText::Draw(Rect *theRect)
{
         ForceNextPrepare();
         Prepare();
         FontInfo dummy;
         GetTEFontInfo(&dummy);
         TEDeactivate(macTE);
         inherited::Draw(theRect);
} void     CMyEditText::Dispose( void)
{
         inherited::Dispose();                           /* Pass message on to superclass */
}
void     CMyEditText::SetTextPtr(
         Ptr                      textPtr,               /* Pointer to some text
                  */
         long                     numChars)              /* Number of characters in the text
{
         CheckInsertion(numChars, FALSE);
         char **handle,*ptr;
         short k,len;
         handle = TEGetText(macTE);
         len = (**macTE).teLength;
         ptr = *handle;
         for (k=0;(k<32000)&&numChars&&len>0;k++,numChars--,ptr++,textPtr++,len--) {
                  if (*ptr!=*textPtr)
                           break;
         }
         if (numChars) {
                  ForceNextPrepare();
                  Prepare();
                  TESetSelect(k,32000,macTE);
                  TEDelete(macTE);
                  TEInsert(textPtr, numChars, macTE);
         }
}
```

-68-

Appendix "A"

```
/*This file is called: "CMyEditText.h"*/
#pragma once
#include "CEditText.h"
class CMyEditText : public CEditText {            /* Interface for its superclass      */
        void         IMyEditText(CView *anEnclosure, CBureaucrat *aSupervisor,
                                 short aWidth, short aHeight,
                                 short aHEncl, short aVEncl,
                                 SizingOption aHSizing, SizingOption aVSizing,
                                 short aLineWidth);
        virtual void Dispose(void);
        virtual void SetTextPtr(Ptr textPtr, long numChars);
        virtual void Draw(Rect *area);
        virtual void GetTextString( StringPtr aString);
};
```

-69-

Appendix "A"

```
/*This file is called: "CMyIcon.cp"*/
#include "CMyIcon.h"
#include "CPaneBorder.h"
void CMyIcon::IMyIcon( CView *anEnclosure, CBureaucrat *aSupervisor,
                        short aHEncl, short aVEncl, short iconID)
{
    CPaneBorder *aBorder;

CIconPane::IIconPane( anEnclosure, aSupervisor, aHEncl+1, aVEncl+1,
                          sizFIXEDSTICKY, sizFIXEDSTICKY,iconID,TRUE);
    aBorder = new(CPaneBorder);
    aBorder->IPaneBorder(kBorderFrame);
    SetBorder(aBorder);
}
short       CMyIcon::GetLeft()
{
    return(hEncl-1);
}
short       CMyIcon::GetRight()
{
    return(hEncl+width);
}
void CMyIcon::Draw( Rect *area)
{
    DrawIcon( FALSE);
} void CMyIcon::Dispose( void)
{
    inherited::Dispose();
}
```

Appendix "A"

```
/*This file is called: "CMyIcon.h"*/
#pragma once
#include "CIconPane.h"
class CMyIcon : public CIconPane
{
        void    IMyIcon( CView *anEnclosure, CBureaucrat *aSupervisor,
                                 short aHEncl, short aVEncl, short iconID);
        virtual void    Draw( Rect *area);
        short                   GetLeft();
        short                   GetRight();
        virtual void    Dispose( void);
};
```

Appendix "A"

```
/*This file is called: "CNode.cp"*/
#include "CList.h"
#include "CNode.h"
#include "CDrawableNode.h"
#include "Commands.h"
#include "CWindow.h"
void        CNode::INode()
{
        CChunk::IChunk();
        its1Input = new(CList);
        its1Input->IList();
        its2Input = new(CList);
        its2Input->IList();
        itsOutput = new(CList);
        itsOutput->IList();
}

Boolean     CNode::Computable()
{
        return(FALSE);
}
void        CNode::Dispose()
{
        its1Input->Dispose();
        its2Input->Dispose();
        itsOutput->Dispose();
        inherited::Dispose();
} void        CNode::UpdateOutputConnection()
{
} void        CNode::UpdateInputConnection()
{
} void        CNode::Open()
{
        itsDialog->TalkToUser();
}
```

-72-

Appendix "A"

```
/*This file is called: "CNode.h"*/
#pragma once
#include "CList.h"
#include "CDrawable.h"                                          /* Interface for its superclass        */
#include "LongQD.h"
#include "CArray.h"
#include "CMyDLOGDir.h"
#include "CChunk.h"

class CNode : public CChunk {           /* Class Declaration                                           */
        void            CNode();
        void            Dispose();
        virtual void            Open();
        void            UpdateOutputConnection();
        void            UpdateInputConnection();
        Boolean         Computable();
        CList           *its1Input,*its2Input,*itsOutput;
        CMyDLOGDir      *itsDialog;
        Boolean         Cancelled;
};
```

-73-

Appendix "A"

```
/*This file is called: "CQTChore.cp"*/
#include "Global.h"
#include "CQTChore.h"
#include "CQTPane.h"
void        CQTChore::IQTChore(CQTPane *theQTPane)
{
        itsPane = theQTPane;
} void    CQTChore::Perform(
        long    *maxSleep)                              /* Ignored
                */
{
        itsPane->Dawdle(maxSleep);
}
```

Appendix "A"

```
/*This file is called: "CQTChore.h"*/
#pragma once
include "CChore.h"
CLASS CQTPane;                                          /* Interface for its superclass     */
class CQTChore : public CChore {                        /* Class Declaration                */
        void            IQTChore(CQTPane *theQTPane);
        virtual void    Perform(long *maxSleep);
        CQTPane *itsPane;
};
```

Appendix "A"

```
/*This file is called: "CQTPane.cp"*/
#include "Global.h"
#include "CQTPane.h"
#include "CEnvironment.h"
#include "Movies.h"
#include "CWindow.h"
#include "CQTChore.h"
#include "CApplication.h"
#include "CMoviePane.h"
#include "CFrameNumber.h"
#include "extras.h"
extern  CApplication *gApplication;
extern  RgnHandle       gUtilRgn;                   /* Utility region
            */
void FailMC(ComponentResult    theError);
void FailMC(ComponentResult    theError)
{
} pascal Boolean MyPlayerFilterWithRefCon(MovieController mc,short action,
                                        TimeRecord *params, CQTPane *thisthis);
pascal Boolean MyPlayerFilterWithRefCon(MovieController mc,short action,
                                        TimeRecord *params, CQTPane *thisthis)
{
        if (action == mcActionSetSelectionBegin) {
                thisthis->pseudoStart = ((double)params->value.lo)/((double)params->scale);
        }
        if (action == mcActionSetSelectionDuration) {
                thisthis->pseudoEnd   =   thisthis->pseudoStart   +
((double)params->value.lo)/((double)params->scale);
        }
        return FALSE;
} pascal Movie GetMovie(void);
pascal Movie GetMovie(void)
{
        SFTypeList typeList;
        StandardFileReply reply;
        Movie     aMovie;
        short     movieResFile,movieResID;
        Str255    movieName;
        Boolean   wasChanged;
        typeList[0] = MovieFileType;
        StandardGetFilePreview(NULL,1,typeList,&reply);
        OpenMovieFile(&reply.sfFile,&movieResFile,fsRdPerm);
        movieResID = 0;
        NewMovieFromFile(&aMovie,movieResFile,&movieResID,(unsigned char *)movieName,
                                        newMovieActive,&wasChanged);
        CloseMovieFile(movieResFile);
        return aMovie;
} void    CQTPane::IQTPane(
        CView           *anEnclosure,
        CBureaucrat     *aSupervisor,
        short           aWidth,
        short           aHeight,
        short           aHEncl,
        short           aVEncl,
        Movie           theMovie)
{
        Rect    movieRect;
        CPane::IPane( anEnclosure, aSupervisor, aWidth, aHeight, aHEncl, aVEncl,
                                sizFIXEDLEFT, sizFIXEDTOP);
        itsMovie = GetMovie();

Prepare();
        ForceNextPrepare();

long scale;
        short k,i;
        Media theMedia;
        OSType mediaType;
        k = GetMovieTrackCount(itsMovie);
        for (i=1;i<=k;i++) {
                itsTrack = GetMovieIndTrack(itsMovie,i);
                theMedia = GetTrackMedia(itsTrack);
                GetMediaHandlerDescription(theMedia,&mediaType,NULL,NULL);
                if (mediaType == VideoMediaType)
                        break;
        }
        if (mediaType == VideoMediaType) {
                itsMediaScale = GetMediaTimeScale(theMedia);
        }
        else {
                itsMediaScale = 60;
                itsTrack = NULL;
        } movieRect.left = 0;
        movieRect.right = aWidth;
        movieRect.bottom = aHeight;

if (itsTrack)
                movieRect.top = 0;
        else
                movieRect.top = aHeight;
        mc = NewMovieController(itsMovie,&movieRect,mcScaleMovieToFit);
```

-76-

Appendix "A"

```
                MCSetActionFilterWithRefCon(mc,(MCActionFilterWithRefCon)
                                            MyPlayerFilterWithRefCon,(long)this);
                MCDoAction(mc,mcActionSetFlags,(long *)mcFlagSuppressStepButtons);
                if (member(itsEnclosure,CMoviePane)) {
                    if (itsTrack) {
                        (((CMoviePane *)itsEnclosure)->itsFrameCtl)->
                                SetFrameNumber(TrackTimeToMediaTime(
                                    MCGetCurrentTime(mc,&scale),itsTrack));
                        (((CMoviePane *)itsEnclosure)->itsFrameCtl)->
                                SetFPS(itsMediaScale);
                        (((CMoviePane *)itsEnclosure)->itsStartCtl)->
                                SetFPS(itsMediaScale);
                        (((CMoviePane *)itsEnclosure)->itsEndCtl)->
                                SetFPS(itsMediaScale);
                        (((CMoviePane *)itsEnclosure)->itsSynchCtl)->
                                SetFPS(itsMediaScale);

long frames = GetMediaDuration(theMedia);

(((CMoviePane *)itsEnclosure)->itsFrameCtl)->
                                SetMaxFrameNumber(frames);
                        (((CMoviePane *)itsEnclosure)->itsStartCtl)->
                                SetMaxFrameNumber(frames);
                        (((CMoviePane *)itsEnclosure)->itsEndCtl)->
                                SetMaxFrameNumber(frames);
                        (((CMoviePane *)itsEnclosure)->itsSynchCtl)->
                                SetMaxFrameNumber(frames);
                    }
                    else {
                        long num60frames;
                        num60frames = MCGetCurrentTime(mc,&scale);
                        num60frames = num60frames/scale*60;
                        (((CMoviePane *)itsEnclosure)->itsFrameCtl)->
                                SetFrameNumber(num60frames);
                        (((CMoviePane *)itsEnclosure)->itsFrameCtl)->
                                SetFPS(60);
                        (((CMoviePane *)itsEnclosure)->itsStartCtl)->
                                SetFPS(60);
                        (((CMoviePane *)itsEnclosure)->itsEndCtl)->
                                SetFPS(60);
                        (((CMoviePane *)itsEnclosure)->itsSynchCtl)->
                                SetFPS(60);
                        long frames = GetMovieDuration(itsMovie);
                        (((CMoviePane *)itsEnclosure)->itsFrameCtl)->
                                SetMaxFrameNumber(((double)frames)/((double)scale)*60.0);
                        (((CMoviePane *)itsEnclosure)->itsStartCtl)->
                                SetMaxFrameNumber(((double)frames)/((double)scale)*60.0);
                        (((CMoviePane *)itsEnclosure)->itsEndCtl)->
                                SetMaxFrameNumber(((double)frames)/((double)scale)*60.0);
                        (((CMoviePane *)itsEnclosure)->itsSynchCtl)->
                                SetMaxFrameNumber(((double)frames)/((double)scale)*60.0);
                    }
                }
                FailMC(MCEnableEditing(mc,TRUE));
                wantsClicks = TRUE;
                itsChore = new(CQTChore);
                itsChore->IQTChore(this);
                gApplication->AssignIdleChore(itsChore);
        } void    CQTPane::Dispose( void)
{
        DisposeMovieController(mc);                     /* Get rid of control record    */
        mc = NULL;
        gApplication->CancelIdleChore(itsChore);
        inherited::Dispose();                           /* Pass message on to superclass */
} void    CQTPane::Hide(void)
{
        MCDoAction(mc,mcActionPlay,0);
        inherited::Hide();
} void    CQTPane::Activate()
{
        Rect                    tempRect;

if (!active) {
                active = TRUE;
                ForceNextPrepare();

Prepare();
                HidePen();
                FailMC(MCActivate(mc,macPort,TRUE));
                ShowPen();

Refresh();
        }
} void    CQTPane::Deactivate( void)
{
        Rect                    tempRect;
        if (active) {
                MCDoAction(mc,mcActionPlay,0);
                active = FALSE;
                ForceNextPrepare();
```

-77-

Appendix "A"

```
                Prepare();
                HidePen();
                FailMC(MCActivate(mc,macPort,FALSE));
                ShowPen();

FrameToWindR( &aperture, &tempRect);
                DrawAll(&tempRect);
                ValidRect(&tempRect);
        }
}
void    CQTPane::Draw(
        Rect            *area)                                  /* Portion which must be drawn         */
{
                FailMC(MCDraw(mc,macPort));
}
void    CQTPane::DoClick(
        Point           hitPt,                                  /* Mouse location in Frame coords      */
        short           modifierKeys,                           /* State of modifier keys              */
        long            when)                                   /* Tick time of mouse click            */
        */
{
        register short  whichPart;                              /* Part of control clicked in          */
        short                   origValue;                      /* Original control setting            */
        */
        short                   delta;                          /* Change in control setting           */
        LongPt                  tmp;
        ForceNextPrepare();
        Prepare();
        FailMC(MCClick(mc,macPort,hitPt,when,modifierKeys));
} void CQTPane::Dawdle(long       *maxSleep)
{
        long scale;
        if (member(itsEnclosure,CMoviePane)) {
                if (itsTrack) {
                        (((CMoviePane *)itsEnclosure)->itsFrameCtl)->
                                        SetFrameNumber(TrackTimeToMediaTime(
                                                MCGetCurrentTime(mc,&scale),itsTrack));
                        (((CMoviePane *)itsEnclosure)->itsStartCtl)->
                                        SetFrameNumber(TrackTimeToMediaTime(
MIN(pseudoStart,pseudoEnd)*((double)scale)+0.5,itsTrack));
                        (((CMoviePane *)itsEnclosure)->itsEndCtl)->
                                        SetFrameNumber(TrackTimeToMediaTime(
MAX(pseudoStart,pseudoEnd)*((double)scale)+0.5,itsTrack));
                        (((CMoviePane *)itsEnclosure)->itsStartCtl)->
                                        SetMaxFrameNumber(TrackTimeToMediaTime(
MAX(pseudoStart,pseudoEnd)*((double)scale)+0.5,itsTrack));
                        (((CMoviePane *)itsEnclosure)->itsEndCtl)->
                                        SetMinFrameNumber(TrackTimeToMediaTime(
MIN(pseudoStart,pseudoEnd)*((double)scale)+0.5,itsTrack));
                }
                else {
                        long num60frames;
                        num60frames = MCGetCurrentTime(mc,&scale);
                        num60frames = ((double) num60frames)/((double)scale)*60.0+0.5;
                        (((CMoviePane *)itsEnclosure)->itsFrameCtl)->
                                        SetFrameNumber(num60frames);
                        (((CMoviePane *)itsEnclosure)->itsStartCtl)->
                                        SetFrameNumber(MIN(pseudoStart,pseudoEnd)*60.0+0.5);
                        (((CMoviePane *)itsEnclosure)->itsEndCtl)->
                                        SetFrameNumber(MAX(pseudoStart,pseudoEnd)*60.0+0.5);
                        (((CMoviePane *)itsEnclosure)->itsStartCtl)->
                                        SetMaxFrameNumber(MAX(pseudoStart,pseudoEnd)*60.0+0.5);
                        (((CMoviePane *)itsEnclosure)->itsEndCtl)->
                                        SetMinFrameNumber(MIN(pseudoStart,pseudoEnd)*60.0+0.5);
                }
        }
        if (ReallyVisible())
                *maxSleep = 1;
        else
                *maxSleep = 60;
        Prepare();
        ForceNextPrepare();
        FailMC(MCIdle(mc));
}
```

Appendix "A"

```c
/*This file is called: "CQTPane.h"*/
#pragma once
#include "CPane.h"
#include "Global.h"                                  /* Interface for its superclass    */
#include "Movies.h"
CLASS CQTChore;

class CQTPane : public CPane {                  /* Class Declaration
    MovieController   mc;                       /* Toolbox control record              */
    Movie             itsMovie;
    Track             itsTrack;
    long              itsMediaScale;
    double            pseudoStart,pseudoEnd;    /*** Instance Methods **/
    void    IQTPane(CView       *anEnclosure,
                    CBureaucrat                *aSupervisor,
                    short                      aWidth,
                    short                      aHeight,
                    short                      aHEncl,
                    short                      aVEncl,
                    Movie                      theMovie);
    virtual void    Dispose(void);
    virtual void    Hide(void);
    virtual void    Activate(void);
    virtual void    Deactivate(void);
    virtual void    Draw(Rect *area);
    virtual void    DoClick(Point hitPt, short modifierKeys, long when);
    virtual void    Dawdle(long *maxSleep);
    CQTChore *itsChore;
};
```

Appendix "A"

```
/*This file is called: "CRemoveChunkChore.cp"*/
#include "CRemoveChunkChore.h"
#include "CChunk.h"
void    CRemoveChunkChore::Perform(
        long    *maxSleep)
{
}                                                                   /* Null Method
                              */
void    CRemoveChunkChore::IRemoveChunkChore(CChunk *theChunk)
{
        itsChunk = theChunk;
}
```

-80-

Appendix "A"

```
/*This file is called: "CRemoveChunkChore.h"*/
#pragma once
#include "CChore.h"                                    /* Interface for its superclass    */
#include "CChunk.h"
class CRemoveChunkChore : public CChore {              /* Class Declaration               */
        virtual void        Perform(long *maxSleep);
        virtual void        IRemoveChunkChore(CChunk *theChunk);
        CChunk   *itsChunk;
};
```

Appendix "A"

```
/*This file is called: "CSinkDir.cp"*/
#include "CSinkDir.h"
#include "CMyDLOGDir.h"
#include "CDLOGSink.h"
#include "CDecorator.h"
#include "CDesktop.h"
#define kSinkDLOG         133
extern  CDecorator *gDecorator;
extern  CDesktop *gDesktop;

void CSinkDir::ISinkDir(CDirectorOwner *aSupervisor)
{
        CMyDLOGDir::IMyDLOGDir(kSinkDLOG, aSupervisor);
}
```

-82-

Appendix "A"

```
/*This file is called: "CSinkDir.h"*/
#pragma once
#include "CMyDLOGDir.h"
class CSinkDir : public CMyDLOGDir
{
        void ISinkDir(CDirectorOwner *aSupervisor);
};
```

Appendix "A"

```
/*This file is called: "CSinkNode.cp"*/
#include "CSinkNode.h"
#include "CDrawableSink.h"

void        CSinkNode::ISinkNode(CView            *anEnclosure,
                                  CBureaucrat     *aSupervisor,
                                  Point origin)
{
        CNode::INode();
        itsDrawable = (CDrawableSink *) new(CDrawableSink);
        ((CDrawableSink *) itsDrawable)->IDrawableSink(anEnclosure,
aSupervisor,origin,this);
        this->DependUpon(itsDrawable);
}
void        CSinkNode::Dispose()
{
        itsDrawable->Dispose();
        inherited::Dispose();
} void        CSinkNode::Open()
{
        StandardFileReply reply;
        FSSpec mySpec;
        short resId = 0;
        Point where = {-1,-1};
        CustomPutFile("\pSave the Movie as:","\p",&reply,
                                    2011,where,NULL,NULL,NULL,NULL,NULL);
}
```

-84-

Appendix "A"

```
/*This file is called: "CSinkNode.h"*/
#pragma once
include "CNode.h"                                          /* Interface for its superclass    */ class CSinkNode : public CNode {    /* Class Declaration
        void            ISinkNode(CView    *anEnclosure,
                                  CBureaucrat  *aSupervisor,
                                  Point origin);

void            Dispose();
        virtual         void Open();
        Str255          itsName;
};
```

Appendix "A"

```
/*This file is called: "CSourceNode.cp"*/
#include "CSourceNode.h"
#include "CDrawableSource.h"
#include "QuickTimeComponents.h"
#include "Movies.h"
#include "Script.h"
#include "CWindow.h"
CLASS CDesktop;
CLASS CDirector;
extern  OSType    gSignature;
extern  CDesktop  *gDesktop;           /* The enclosure for all windows */ void        CSourceNode::ISourceNode(CView          *anEnclosure,
                                     CBureaucrat    *aSupervisor,
                                     Point origin)
{
    CNode::INode();
    itsDrawable = (CDrawableSource *) new(CDrawableSource);
    ((CDrawableSource *) itsDrawable)->IDrawableSource(anEnclosure,
aSupervisor,origin,this);
    this->DependUpon(itsDrawable);
}
void        CSourceNode::Dispose()
{
    if (itsMovie!=NULL)
        DisposeMovie(itsMovie);
    if (itsResRefNum)
        CloseMovieFile(itsResRefNum);
    itsDrawable->Dispose();
    inherited::Dispose();
} define kCaptureItem 16
define kCancelItem   2 pascal short CaptureDlgHook(short item,DialogPtr theDialog,CSourceNode *thisthis);
pascal short CaptureDlgHook(short item,DialogPtr theDialog,CSourceNode *thisthis)
{
    if (item!=kCaptureItem) {
        return(item);
    }
    else {
        thisthis->CaptureRequired = TRUE;
        return(kCancelItem);
    }
} define kOpenDLOG 134
void        CSourceNode::Open()
{
    SFTypeList typeList;
    StandardFileReply reply;
    StringPtr     junkH;
    Movie    aMovie;
    short  movieResFile,movieResID;
    Str255 movieName;
    Boolean wasChanged;
    typeList[0] = MovieFileType;
    Point where;
    where.h = where.v = -1;
    this->CaptureRequired = FALSE;
    CustomGetFilePreview(NULL,1,typeList,&reply,kOpenDLOG,
                         where,(DlgHookYDProcPtr)CaptureDlgHook,
                         /*(ModalFilterYDProcPtr)MyModalFilter,*/NULL,
                         NULL,NULL,this);
    if (this->CaptureRequired) {
        this->CaptureRequired = FALSE;
        DoCapture();
    }
}

SeqGrabComponent CSourceNode::makeSequenceGrabber(WindowPtr aWindow)
{
    SeqGrabComponent anSG;
    OSErr err = noErr;
    anSG = OpenDefaultComponent(SeqGrabComponentType,0);
    if (anSG) {
        err = SGInitialize(anSG);
        if (!err) {
            err = SGSetGWorld(anSG,(CGrafPtr) aWindow,NULL);
        }
    }
    if (err&&anSG) {
        CloseComponent(anSG);
        anSG = NULL;
    }
    return anSG;
} void CSourceNode::makeGrabChannels(SeqGrabComponent anSG,SGChannel *videoChannel,
                                   SGChannel *soundChannel,Rect *bounds,
                                   Boolean willRecord)
{
    OSErr err;
    long usage;
    usage = seqGrabPreview;
    if (willRecord)
        usage |= seqGrabRecord;
```

-86-

Appendix "A"

```
        err = SGNewChannel(anSG,VideoMediaType,videoChannel);
        if (!err) {
                err = SGSetChannelBounds (*videoChannel,bounds);
                if (!err)
                        err = SGSetChannelUsage(*videoChannel,usage|seqGrabPlayDuringRecord);
                if (err) {
                        SGDisposeChannel(anSG,*videoChannel);
                        *videoChannel = NULL;
                }
        }
        err = SGNewChannel(anSG,SoundMediaType,soundChannel);
        if (!err) {
                err = SGSetChannelUsage(*soundChannel,usage);
                if (err) {
                        SGDisposeChannel(anSG,*soundChannel);
                        *soundChannel = NULL;
                }
        }
}

OSErr CSourceNode::setGrabFile(SeqGrabComponent theSG)
{
        StandardFileReply reply;
        FSSpec mySpec;
        short resId = 0;
        Point where = (-1,-1);
        OSErr err = noErr;
        CustomPutFile("\pSave the Movie as:",itsName,&reply,
                        140,where,NULL,NULL,NULL,NULL,NULL);
        if (reply.sfGood) {
                FSMakeFSSpec(reply.sfFile.vRefNum,reply.sfFile.parID,reply.sfFile.name,&mySpec);
                if (itsMovie!=NULL) {
                        DisposeMovie(itsMovie);
                }
                        if (!err) {
                                err = SGSetDataOutput(theSG,&mySpec,seqGrabToDisk);
                                return (noErr);
                        }
        }
        return (ioErr);
} pascal Boolean NeededProc(DialogPtr theDialog,
                                                        EventRecord *theEvent,
                                                        short itemHit,
                                                        CSourceNode *thisthis);
pascal Boolean NeededProc(DialogPtr theDialog,
                                                        EventRecord *theEvent,
                                                        short itemHit,
                                                        CSourceNode *thisthis)
{
        return (FALSE);
} void    CSourceNode::DoCapture(void)
{
        WindowPtr theWindow;
        CGrafPort tempPort;
        SeqGrabComponent theSG;
        SGChannel videoChannel,soundChannel;
        OSErr err;
        theWindow = makeWindow();
        theSG = makeSequenceGrabber(theWindow);
        FailNIL(theSG);
        err = setGrabFile(theSG);
        CheckError(err,"\pNo output file");
        Component in,out;
        Handle theH;
        makeGrabChannels(theSG,&videoChannel,&soundChannel,&theWindow->portRect,TRUE);
        SGSetChannelVolume(soundChannel,0x3f);
        if ((videoChannel == NULL)&&(soundChannel == NULL))
                CheckError(err,"\pNo sound or video available");
        if (videoChannel)
                SGSettingsDialog(theSG,videoChannel,0,NULL,
                                        DoTheRightThing,(SGModalFilterProcPtr)NeededProc,(long)this);
        if (soundChannel)
                SGSettingsDialog(theSG,soundChannel,0,NULL,
                                        DoTheRightThing,(SGModalFilterProcPtr)NeededProc,(long)this);
        err = SGSetMaximumRecordTime(theSG,1*60);
        CheckError(err,"\pCan't set maximum record time");
        err = SGStartRecord(theSG);
        CheckError(err,"\pCan't start recording");
        while (!err)
                err = SGIdle(theSG);
        if (err == grabTimeComplete)
                err = noErr;
        CheckError(err,"\pError while recording");
        err = SGStop(theSG);
        CloseMovieFile(itsResRefNum);
        CheckError(err,"\pError creating movie");
        CloseComponent(theSG);
        itsWindow->Dispose();
} void CSourceNode::CheckError(OSErr error,Str255 displayString)
{
        if (error == noErr)
                return;
        FailOSErr(error);
```

-87-

Appendix "A"

```
}
WindowPtr CSourceNode::makeWindow(void)
{
        Rect theSize;
        itsWindow = new(CWindow);
        itsWindow->IWindow(WINDMulti, FALSE, gDesktop, (CDirector *)this);
        theSize.top = theSize.bottom = 120;
        theSize.left = theSize.right = 160;
        itsWindow->SetSizeRect(&theSize);
        itsWindow->Prepare();
        itsWindow->Select();
        return(itsWindow->macPort);
}
```

Appendix "A"

```
/*This file is called: "CSourceMode.h"*/
#pragma once
#include "CMode.h"
#include "QuickTimeComponents.h"                          /* Interface for its superclass     */
CLASS CWindow;
class CSourceMode : public CMode {                /* Class Declaration            */
        void            ISourceMode(CView           *anEnclosure,
                                    CBureaucrat    *aSupervisor,
                                    Point origin);
        virtual void            Open();
        virtual void            Dispose();
        virtual void DoCapture(void);
        virtual SeqGrabComponent makeSequenceGrabber(WindowPtr aWindow);
        virtual void CheckError(OSErr error,Str255 displayString);
        virtual WindowPtr makeWindow(void);
        virtual void makeGrabChannels(SeqGrabComponent anSG,SGChannel *videoChannel,
                                      SGChannel *soundChannel,Rect *bounds,
                                      Boolean willRecord);
        virtual OSErr setGrabFile(SeqGrabComponent theSG);
        Boolean         CaptureRequired;
        Movie           itsMovie;
        short           itsResRefNum;
        Str255          itsName;
        CWindow         *itsWindow;
};
```

-89-

Appendix "A"

```
/*This file is called: "CStringArray.cp"*/
#include "CStringArray.h"
#include "Packages.h"
#include "qsort++.h"
Boolean            CStringArray::cCompAscending;
CStringArray*      CStringArray::cCurrArray;

void CStringArray::IStringArray( short maxStringLength)
{
       CArray::IArray( Min( maxStringLength, sizeof( Str255)));
} void CStringArray::IRes( short strListID, short maxStringLength)
{
       Handle   strList;
       Str255   str;
       short    i, numStrings;

IArray( maxStringLength);
       strList = GetResource( 'STR#', strListID);
       FailNILRes( strList);
       numStrings = *(short*) *strList;
       Resize( numStrings);
       for (i = 1; i <= numStrings; i++)
       {
              GetIndString( str, strListID, i);
              str[0] = Min( str[0], elementSize);
              InsertAtIndex( str, i);
       }
} static int EqualStrings( void* str1, void* str2)
       {
              return IUEqualString( (StringPtr)str1, (StringPtr)str2);
       } long CStringArray::FindString( StringPtr targetString)
{
       cCompAscending = TRUE;

return Search( targetString, EqualStrings);
} void CStringArray::swap( size_t i, size_t j)
       {
              CStringArray::cCurrArray->Swap( i+1, j+1);
       } int CStringArray::CompareStrings( size_t index1, size_t index2)
       {
              unsigned char *items = (unsigned char*) *CStringArray::cCurrArray->hItems;
              if (!cCompAscending)
              {
                     long tmp = index1;
                     index1 = index2;
                     index2 = tmp;
              }
              return IUCompString( items + CStringArray::cCurrArray->ItemOffset( index1+1),
                                    items + CStringArray::cCurrArray->ItemOffset( index2+1));
       }
void CStringArray::Sort( Boolean fAscending)
{
       SignedByte        state = HGetState( hItems);
       cCompAscending = fAscending;
       cCurrArray = this;
       HLock( hItems);
       qsortplusplus( numItems, CompareStrings, swap);
       HSetState( hItems, state);
       cCurrArray = NULL;
}
```

-90-

Appendix "A"

```
/*This file is called: "CStringArray.h"*/
#pragma once
#include "CArray.h"
#include <size_t.h>
class CStringArray : public CArray
{
        void IStringArray( short maxStringLength);
        virtual void IRes( short strListID, short maxStringLength);
        virtual long FindString( StringPtr targetString);
        virtual void Sort( Boolean fAscending);
protected:
        static Boolean              cCompAscending;
        static CStringArray         *cCurrArray;
        static void swap( size_t i, size_t j);
        static int CompareStrings( size_t index1, size_t index2);
};
```

Appendix "A"

```cpp
/*This file is called: "CSyncBar.cp"*/
#include "CSyncBar.h"
#include "CWindow.h"
#include "extras.h"
#include "CMoviePane.h"
void CSyncBar::ISyncBar( CView *anEnclosure, CBureaucrat *aSupervisor,
                         short aHEncl, short aVEncl)
{
        CPane::IPane( anEnclosure, aSupervisor, 129, 4, aHEncl, aVEncl,
                      siXFIXEDSTICKY, siXFIXEDSTICKY);

SetCanBeGopher(FALSE);
        SetWantsClicks(TRUE);
        theLoc = 4;
} void CSyncBar::DoClick( Point          hitPt,             short          modifierKeys,
                                                          long           when)
{
        short old = theLoc;
        Prepare();
        do {
                GetMouse(&hitPt);
                theLoc = hitPt.h;
                theLoc = MAX(4,theLoc);
                theLoc = MIN(width-4,theLoc);
                if (theLoc!=old) {
                        Refresh();
                        GetWindow()->Update();
                        old = theLoc;
                }
        } while (StillDown());
} void    CSyncBar::Draw(Rect *dummy)
{
        Prepare();
        Rect ar;
        FrameToQDR(&frame,&ar);
        EraseRect(&ar);
        MoveTo(theLoc,0);
        LineTo(theLoc,0);
        MoveTo(theLoc-1,1);
        LineTo(theLoc+1,1);
        MoveTo(theLoc-2,2);
        LineTo(theLoc+2,2);
} void    CSyncBar::SetPercent(double theval)
{
        short old = theLoc;
        theLoc = theval*((double)width - 8.0)+4.0+0.5;
        if (theLoc!=old)
                Refresh();
} double  CSyncBar::GetPercent()
{
        return((((double)theLoc)-4.0)/((double)width - 8.0));
}
```

-92-

Appendix "A"

```
/*This file is called: "CSyncBar.h"*/
#pragma once
#include "CPane.h"
class CSyncBar : public CPane
{
        void ISyncBar( CView *anEnclosure, CBureaucrat *aSupervisor,
                                        short aHEncl, short aVEncl);
        virtual void    DoClick(        Point           hitPt,
                                                        short           modifierKeys,
                                                        long            when);

virtual void    Draw(Rect *dummy);
        virtual void    SetPercent(double theval);
        virtual double  GetPercent();
        short theLoc;
};
```

Appendix "A"

```
/*This file is called: "extras.h"*/
#pragma once
#include "math.h"
#define PI (2.0*acos(0.0))
#define ABS(x) ((x)>0?(x):-(x))
#define MIN(x,y) (((x)>(y))?(y):(x))
#define MAX(x,y) (((x)<(y))?(y):(x))

enum PaintTools {
        toolSOURCE = 1,
        toolEFFECT,
        toolFILTER,
        toolSINK
};

#define         MENUtools       101
#define WINDMulti       500         /* Resource ID for WIND template */
#define GRIDMulti       128
#define ALRTnoQT        100         /*Resource ID of No QuickTime alert */
#define KeyDelete       51
```

Appendix "A"

```
/*This file is called: "Multi.cp"*/
#include "CMultiApp.h"
void main()
{
        CMultiApp       *MultiApp;
        MultiApp = new CMultiApp;
        MultiApp->IMultiApp();
        MultiApp->Run();
        MultiApp->Exit();
}
```

What is claimed is:

1. An iconic audiovisual data editing system operable in conjunction with a general purpose computer, comprising:

a visual display providing a working area capable of receiving icons and symbols thereon;

a first icon generated by said system and capable of being placed on said working area and symbolizing an audiovisual data transformation process performable by said system, said first icon having a first input portion representing a first process input and an output portion representing a process output, said first process input capable of receiving a first electrical input signal representing a first audiovisual datum, said process transforming said first input signal to produce an electrical output signal at said process output representing a transformation of said first audiovisual datum, said first icon further having synchronization data associated therewith to allow said process input to be synchronized independent of an operation of said process; and a first audiovisual data flow symbol generated by said system and capable of being placed on said working area, symbolizing a communication of audiovisual data between icons and thereby representing a communication of an electrical signal between audiovisual data transformation processes performable by said system, said first icon and said first symbol freely movable on said working area to symbolize a flow of said first audiovisual datum as a function of a relative location of said first icon and said first symbol on said working area.

2. The system as recited in claim 1 further comprising a second icon capable of being placed on said working area, said audiovisual data flow symbol capable of symbolically joining said output portion of said first icon to a first input portion of said second icon.

3. The system as recited in claim 1 wherein said first icon has a second input portion representing a second process input, said second process input capable of receiving a second electrical input signal representing a second audiovisual datum, said process combining and transforming said first and second input signals to produce said electrical output signal at said process output representing a combination and transformation of said first and second audiovisual data.

4. The system as recited in claim 1 wherein said first audiovisual datum is a portion of audio data.

5. The system as recited in claim 1 wherein said first audiovisual datum is a portion of a visual image.

6. The system as recited in claim 1 wherein said first audiovisual datum is a portion of a single frame of a video stream.

7. The system as recited in claim 1 wherein said audiovisual data flow symbol is a line capable of joining said icons.

8. The system as recited in claim 1 wherein said first icon symbolizes a plurality of audiovisual data transformation processes.

9. The system as recited in claim 1 wherein said first icon is initially located in an icon selection area proximate said working area.

10. The system as recited in claim 1 wherein said audiovisual data transformation process is a filter.

11. The system as recited in claim 1 wherein said audiovisual data transformation process is an effect.

12. The system as recited in claim 1 further comprising a source icon capable of being placed on said working area and only having an output.

13. The system as recited in claim 1 further comprising a sink icon capable of being placed on said working area and only having an input.

14. The system as recited in claim 2 further comprising a single hierarchical icon designating said flow and a synchronization of said first and second icons as represented by said relative location of said first and second icons and said first audiovisual data flow symbol.

15. A method of editing an audiovisual datum in an iconic system operable in conjunction with a general purpose computer, comprising the steps of:

providing a working area on a visual display of said system, said working area capable of receiving icons and symbols thereon;

placing a first icon generated by said system on said working area, said first icon symbolizing an audiovisual data transformation process performable by said system, said first icon having a first input portion representing a first process input and an output portion representing a process output, said first process input capable of receiving a first electrical input signal representing a first audiovisual datum, said process transforming said first input signal to produce an electrical output signal at said process output representing a transformation of said first audiovisual datum, said first icon further having synchronization data associated therewith to allow said process input to be synchronized independent of an operation of said process; and placing a first audiovisual data flow symbol on said working area, said first symbol symbolizing a communication of audiovisual data between icons and thereby representing a communication of an electrical signal between audiovisual data transformation processes performable by said system, said first icon and said first symbol freely movable on said working area to symbolize a flow of said first audiovisual datum as a function of a relative location of said first icon and said first symbol on said working area.

16. The method as recited in claim 15 further comprising the step of placing a second icon on said working area, said audiovisual data flow symbol capable of symbolically joining said output portion of said first icon to a first input portion of said second icon.

17. The method as recited in claim 15 wherein said first icon has a second input portion representing a second process input, said second process input capable of receiving a second electrical input signal representing a second audiovisual datum, said process combining and transforming said first and second input signals to produce said electrical output signal at said process output representing a combination and transformation of said first and second audiovisual data.

18. The method as recited in claim 15 wherein said first audiovisual datum is a portion of audio data.

19. The method as recited in claim 15 wherein said first audiovisual datum is a portion of a visual image.

20. The method as recited in claim 15 wherein said first audiovisual datum is a single frame of a video stream.

21. The method as recited in claim 15 further comprising the step of joining said icons with said audiovisual data flow symbol, said audiovisual data flow symbol being a line.

22. The method as recited in claim 15 wherein said first icon symbolizes a plurality of audiovisual data transformation processes.

23. The method as recited in claim 15 wherein said step of placing comprises the step of dragging said first icon from an icon selection area proximate said working area.

24. The method as recited in claim 15 wherein said audiovisual data transformation process is a filter.

25. The method as recited in claim 15 wherein said audiovisual data transformation process is an effect.

26. The method as recited in claim 15 further comprising the step of placing a source icon on said working area, said source icon only having an output.

27. The method as recited in claim 15 further comprising the step of placing a sink icon on said working area, said sink icon only having an input.

28. The method as recited in claim 16 further comprising the step of designating a single hierarchical icon to represent said flow and a synchronization of said first and second icons as represented by said relative location of said first and second icons and said first audiovisual data flow symbol.

29. An iconic audiovisual data editing system operable in conjunction with a general purpose computer, comprising:
 a visual display providing a working area capable of receiving icons and symbols thereon;
 a first icon generated by said system and capable of being placed on said working area and symbolizing a first audiovisual data transformation process performable by said system, said first icon having a first input portion representing a first process input and a first output portion representing a first process output, said first process input capable of receiving a first electrical input signal representing a first audiovisual datum, said process transforming said first input signal to produce a first electrical output signal at said first process output representing a transformation of said first audiovisual datum;
 a second icon capable of being placed on said working area and symbolizing a second audiovisual data transformation process performable by said system, said second icon having a second input portion representing a second process input and a second output portion representing a second process output, said second process input capable of receiving a second electrical input signal representing a second audiovisual datum, said process transforming said second input signal to produce a second electrical output signal at said second process output representing a transformation of said second audiovisual datum; and
 means, associated with one of said first and second icons, for establishing a synchronization of said first and second inputs of said first and second icons.

30. The system as recited in claim 29 wherein each of said first and second icons has a configuration window associated therewith, said configuration window containing said synchronization establishing means.

31. The system as recited in claim 29 further comprising an audiovisual data flow symbol generated by said system and capable of being placed on said working area, symbolizing a communication of audiovisual data between said first and second icons and thereby representing a communication of an electrical signal between said first and second audiovisual data transformation processes performable by said system, said first and second icons and said symbol freely movable on said working area to symbolize a flow of said first and second audiovisual data as a function of a relative location of said first and second icons and said first symbol on said working area.

32. The system as recited in claim 29 wherein a configuration window associated with each of said first and second icons includes a frame counter and start time and end time counters.

33. The system as recited in claim 29 wherein said first and second audiovisual data are portions of audio data.

34. The system as recited in claim 29 wherein said first and second audiovisual data are portions of visual images.

35. The system as recited in claim 29 wherein said first and second audiovisual data are single frames of video streams.

36. The system as recited in claim 29 wherein said first icon symbolizes a plurality of audiovisual data transformation processes.

37. The system as recited in claim 29 wherein said first and second icons are initially located in an icon selection area proximate said working area.

38. The system as recited in claim 29 wherein said first audiovisual data transformation process is a filter.

39. The system as recited in claim 29 wherein said first audiovisual data transformation process is an effect.

40. The system as recited in claim 29 wherein a configuration window associated with said first icon contains a representation of said first output signal to thereby allow viewing of said first output signal.

41. The system as recited in claim 29 further comprising a single hierarchical icon designating said flow and said synchronization of said first and second icons as represented by said relative location of said first and second icons and an associated audiovisual data flow symbol.

42. A method of editing audiovisual data in an iconic system operable in conjunction with a general purpose computer, comprising the steps of:
 providing a working area on a visual display of said system, said working area capable of receiving icons and symbols thereon;
 placing a first icon generated by said system on said working area, said first icon symbolizing a first audiovisual data transformation process performable by said system, said first icon having a first input portion representing a first process input and a first output portion representing a first process output, said first process input capable of receiving a first electrical input signal representing a first audiovisual datum, said process transforming said first input signal to produce a first electrical output signal at said first process output representing a transformation of said first audiovisual datum;
 placing a second icon on said working area, said second icon symbolizing a second audiovisual data transformation process performable by said system, said second icon having a second input portion representing a second process input and a second output portion representing a second process output, said second process input capable of receiving a second electrical input signal representing a second audiovisual datum, said process transforming said second input signal to produce a second electrical output signal at said second process output representing a transformation of said second audiovisual datum; and
 establishing a synchronization between said first and second inputs of said first and second icons to thereby control a flow of said first and second audiovisual data.

43. The method as recited in claim 42 wherein said step of establishing comprises the step of placing a synchronization indicator within a configuration window associated with each of said first and second icons.

44. The method as recited in claim 42 further comprising the step of placing an audiovisual data flow symbol generated by said system on said working area, said symbol symbolizing a communication of audiovisual data between said first and second icons and thereby representing a communication of an electrical signal between said first and second audiovisual data transformation processes performable by said system, said first and second icons and said symbol freely movable on said working area to symbolize a flow of said first and second audiovisual data as a function of a relative location of said first and second icons and said first symbol on said working area.

45. The method as recited in claim 42 further comprising the step of setting a counter within a configuration window associated with each of said first and second icons, said counter selected from the group consisting of:

a frame counter, a start time counter, and an end time counter.

46. The method as recited in claim 42 wherein said first and second audiovisual data are portions of audio data.

47. The method as recited in claim 42 wherein said first and second audiovisual data are portions of visual images.

48. The method as recited in claim 42 wherein said first and second audiovisual data are single frames of video streams.

49. The method as recited in claim 42 wherein said first icon symbolizes a plurality of audiovisual data transformation processes.

50. The method as recited in claim 42 wherein said steps of placing comprise the step of dragging said first and second icons from an icon selection area proximate said working area.

51. The method as recited in claim 42 wherein said first audiovisual data transformation process is a filter.

52. The method as recited in claim 42 wherein said first audiovisual data transformation process is an effect.

53. The method as recited in claim 42 further comprising the step of viewing a representation of said first output signal in a configuration window associated with said first icon.

54. The method as recited in claim 42 further comprising the step of designating a single hierarchical icon to represent said flow and said synchronization of said first and second icons as represented by said relative location of said first and second icons and said audiovisual data flow symbol.

55. An iconic audiovisual data editing system operable in conjunction with a general purpose computer, comprising:

a visual display providing a working area capable of receiving icons and symbols thereon;

an icon selection area proximate said working area;

a source icon generated by said system and located in said icon selection area, capable of being placed on said working area and symbolizing an audiovisual data source, said source icon having an output portion representing a source output, said source icon having a configuration window associated therewith;

a filter icon generated by said system and located in said icon selection area, capable of being placed on said working area and symbolizing a single source audiovisual data transformation process performable by said system, said filter icon having a single input portion representing a single source process input and an output portion representing a single source process output, said filter icon having a configuration window associated therewith;

an effect icon generated by said system and located in said icon selection area, capable of being placed on said working area and symbolizing a multiple source audiovisual data transformation process performable by said system, said effect icon having multiple input portions representing multiple source process inputs and an output portion representing a multiple source process output, said effect icon having a configuration window associated therewith;

a hierarchical icon generated by said system and located in said icon selection area, capable of being placed on said working area and configurable to symbolize multiple audiovisual data transformation processes as a single audiovisual data transformation process performable by said system, said hierarchical icon having an input portion representing a process input and an output portion representing a process output, said hierarchical icon having a configuration window associated therewith;

a sink icon generated by said system and located in said icon selection area, capable of being placed on said working area and symbolizing an audiovisual data destination, said sink icon having an input portion representing a destination input, said sink icon having a configuration window associated therewith;

means for placing selectable ones of said icons at selected locations on said working area, said selected locations representing a relationship between said selected icons and a flow of audiovisual data, said audiovisual data selected from the group consisting of:

audio data, graphical data, a visual image, and a single frame of a video stream;

a plurality of audiovisual data flow symbols generated by said system and capable of being placed on said working area to link said selected ones of said icons together to symbolize a communication of audiovisual data between icons, said icons and said symbols freely movable on said working area to symbolize said flow of audiovisual data as a function of a relative location of said icons and said symbols on said working area; and means, associated with each of said configuration windows, for establishing a synchronization among said inputs of ones of said icons, said configuration windows containing a counter selected from the group consisting of:

an input synchronization counter, a frame counter, a start time counter, and an end time counter.

56. The system as recited in claim 55 wherein said input synchronization counter allows synchronization of multiple inputs of said icons.

* * * * *

UNITED STATES PATENT AND TRADEMARK OFFICE
CERTIFICATE OF CORRECTION

PATENT NO.   : 5,664,216
DATED        : September 2, 1997
INVENTOR(S)  : Trevor Blumenau It is certified that error appears in the above-indentified patent and that said Letters Patent is hereby corrected as shown below:

Col. 2, line 16 ".editing" should be --editing--.

Col. 3, line 38 "De" should be --be--.

Col. 8, line 17 "and'" should be --and--.

Signed and Sealed this

Eleventh Day of November, 1997

*Attest:*

BRUCE LEHMAN

*Attesting Officer*          Commissioner of Patents and Trademarks